US009583032B2

(12) United States Patent
Lamb et al.

(10) Patent No.: US 9,583,032 B2
(45) Date of Patent: Feb. 28, 2017

(54) NAVIGATING CONTENT USING A PHYSICAL OBJECT

(75) Inventors: Mathew J. Lamb, Mercer Island, WA (US); Ben J. Sugden, Woodinville, WA (US); Robert L. Crocco, Jr., Seattle, WA (US); Brian E. Keane, Bellevue, WA (US); Christopher E. Miles, Seattle, WA (US); Kathryn Stone Perez, Kirkland, WA (US); Laura K. Massey, Redmond, WA (US); Alex Aben-Athar Kipman, Redmond, WA (US); Sheridan Martin Small, Seattle, WA (US); Stephen G. Latta, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 113 days.

(21) Appl. No.: 13/488,966

(22) Filed: Jun. 5, 2012

(65) Prior Publication Data

US 2013/0321255 A1 Dec. 5, 2013

(51) Int. Cl.
*G06F 3/01* (2006.01)
*G09G 3/00* (2006.01)

(52) U.S. Cl.
CPC .................................... *G09G 3/003* (2013.01)

(58) Field of Classification Search
CPC ............ G06F 3/01; G06F 3/011–3/014; G06F 2203/012; G06F 17/30; G06F 17/3002; G06F 17/247; G02B 27/017; G09G 3/003; G09G 5/10; G09G 5/006; H04M 1/0283
See application file for complete search history.

(56) References Cited

U.S. PATENT DOCUMENTS

| | | | | |
|---|---|---|---|---|
| 6,037,915 | A * | 3/2000 | Matsueda et al. | 345/8 |
| 7,126,558 | B1 * | 10/2006 | Dempski | 345/8 |
| 7,676,372 | B1 | 3/2010 | Oba | |
| 2004/0090445 | A1 * | 5/2004 | Iizuka et al. | 345/679 |
| 2004/0104935 | A1 | 6/2004 | Williamson et al. | |
| 2006/0028400 | A1 * | 2/2006 | Lapstun et al. | 345/8 |
| 2010/0002909 | A1 * | 1/2010 | Lefevre | G06F 3/04815 382/103 |

(Continued)

OTHER PUBLICATIONS

Ajanki, et al., "Ubiquitous Contextual Information Access with Proactive Retrieval and Augmentation", In Proceedings of 4th International Workshop on Ubiquitous Virtual Reality, Sep. 2009, 28 pages.

(Continued)

*Primary Examiner* — Jennifer Mehmood
*Assistant Examiner* — Sardis F Azongha
(74) *Attorney, Agent, or Firm* — Vierra Magen Marcus LLP

(57) ABSTRACT

Technology is disclosed herein to help a user navigate through large amounts of content while wearing a see-through, near-eye, mixed reality display device such as a head mounted display (HMD). The user can use a physical object such as a book to navigate through content being presented in the HMD. In one embodiment, a book has markers on the pages that allow the system to organize the content. The book could have real content, but it could be blank other than the markers. As the user flips through the book, the system recognizes the markers and presents content associated with the respective marker in the HMD.

23 Claims, 16 Drawing Sheets

(56) References Cited

U.S. PATENT DOCUMENTS

| | | | | |
|---|---|---|---|---|
| 2010/0199232 | A1 | 8/2010 | Mistry et al. | |
| 2011/0018903 | A1 | 1/2011 | Lapstun et al. | |
| 2012/0008003 | A1* | 1/2012 | Lim et al. | 348/222.1 |
| 2012/0032977 | A1 | 2/2012 | Kim et al. | |
| 2012/0050326 | A1* | 3/2012 | Tanaka | 345/633 |
| 2012/0081394 | A1* | 4/2012 | Campbell et al. | 345/633 |
| 2013/0073509 | A1* | 3/2013 | Burkard et al. | 706/52 |

OTHER PUBLICATIONS

Billinghurst, et al., "The MagicBook: A Transitional AR Interface", In Proceedings of Computers and Graphics, Oct. 2001, vol. 25, No. 5, pp. 745-753, 14 pages.

Kato, et al., "Marker Tracking and HMD Calibration for a Video-based Augmented Reality Conferencing System", In Proceedings of the 2nd IEEE and ACM International Workshop on Augmented Reality, Oct. 20, 1999, pp. 85-94, 10 pages.

* cited by examiner

NAVIGATING CONTENT USING A PHYSICAL OBJECT

BACKGROUND

In the past, users frequently had access to computers with keyboards and input devices commonly referred to as "mice." Typically, standard keyboards are best suited for larger devices, and mice are best suited for desktop computers. More recently computing devices such as small, mobile devices have made use of touch sensitive interfaces. However, such interfaces may be impractical for some electronic devices that exist today or are contemplated.

Recently, voice interfaces have been contemplated. Voice interfaces have the benefit of not requiring the user to have the device in their hands. However, voice interfaces have limitations such as their accuracy in human voice recognition.

Without access to conventional input devices such as keyboards, mice, and touch sensitive interfaces, it can be difficult to interface with electronic devices. One example is that a user could find it very difficult to navigate through large amounts of content stored on or accessible to an electronic device. For example, a user could find it difficult to navigate through a large number of sorted data records.

SUMMARY

Technology is disclosed herein to help a user navigate through large amounts of content while wearing a see-through, near-eye, mixed reality display device such as a head mounted display (HMD). The HMD allows the user to view virtual objects overlaid in the user's field of view. The user can use a physical object such as a book to navigate through content being presented in the HMD. As one example, the book has markers that can be identified by the HMD so that the content can be presented in the HMD as the user flips through pages in the book.

One embodiment includes a method of navigating through content. Input is received that specifies what content is to be navigated by a user wearing a see-through, near-eye, mixed reality display. Markers are identified in a physical object using a camera as the user manipulates the physical object. The portions of the content that are associated with the identified markers are determined. Images representing the portions of the content are presented in the see-through, near-eye, mixed reality display device.

One embodiment includes a see-through, near-eye, display device system for navigating digital content. The system includes a see-through, near-eye display device; an image sensor; and logic in communication with the display device and the image sensor. The logic is configured to receive input that specifies what digital content is to be navigated by a user that is manipulating a physical object that has markers. The logic accesses the digital content to be navigated. The logic identifies the markers in the physical object using the image sensor as the user manipulates the physical object. The logic identifies portions of the digital content that are associated with the identified markers. The logic presents images representing the identified portions of the digital content in the see-through, near-eye, display device.

One embodiment includes a computer storage device having instructions stored thereon which, when executed on a processor, cause the processor to help a user navigate digital content using a book that has markers. The instructions cause the processor to receive input from the user that specifies what digital content is to be navigated, and to access the digital content. The instructions cause the processor to identify markers in the book using image data as the user turns pages in the book. The book has an ordered sequence of pages with the markers on the pages. The instructions cause the processor to identify portions of the digital content that are associated with the identified markers. The instructions cause the processor to present virtual images representing the identified portions of the digital content in a see-through, near-eye, display device being worn by the user. The instructions cause the processor to present a navigation aid to the user in the see-through, near-eye display as the user turns the pages in the book.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Technology is disclosed herein to help a user navigate through large amounts of content while wearing a see-through, near-eye, mixed reality display device such as a head mounted display (HMD). The user can use a physical object such as a book to navigate through content being presented in the HMD. In one embodiment, a book has markers on the pages that allow the system to organize the content. The markers could be ordinary text or images. The book could have real content, but it could be blank other than the markers. As the user flips through the book, the system recognizes the markers and presents content associated with the respective marker in the HMD.

The user can rapidly scan through the content by flipping through the pages of the book. One non-limiting example of the content is a large set of records. The user could search for content by flipping back and forth in the book. The user could sequentially advance through the content, perform random access in large jumps, perform a binary search for desired data based on page numbers, etc. In one embodiment, a table of contents is presented in the HMD to help the user find the content faster. In one embodiment, chapter headings are presented in the HMD as the user flips through the book to help the user find content faster.

Figure 1A:
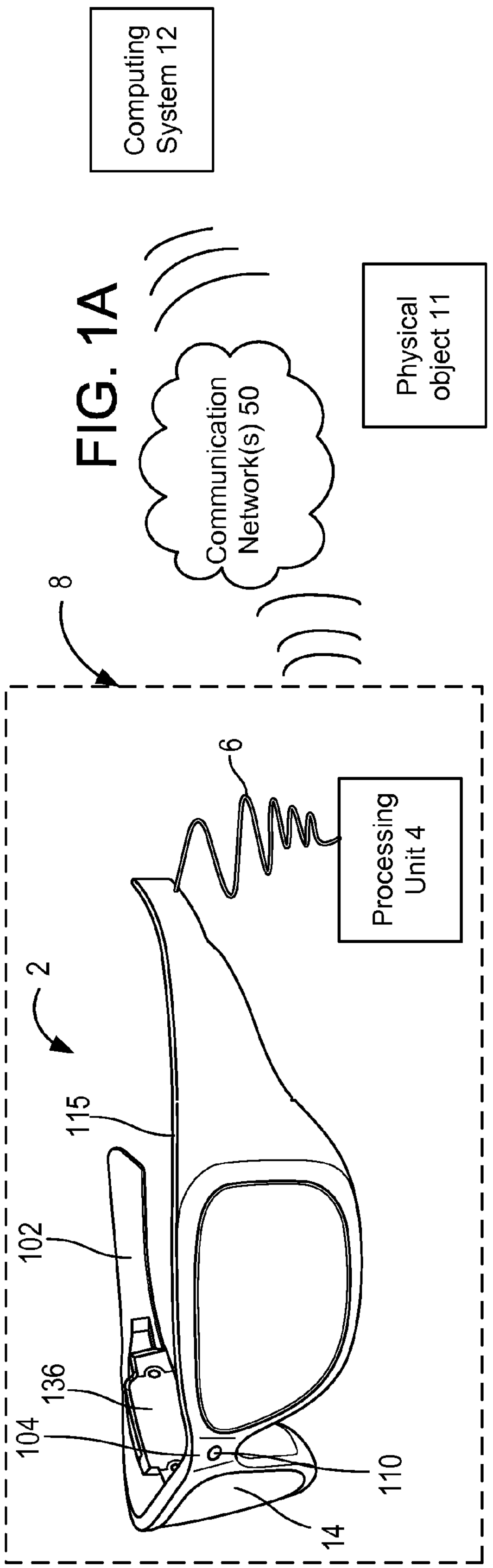
FIG. 1A is a block diagram depicting example components of one embodiment of a see-through, mixed reality display device system.

FIG. 1A is a block diagram depicting example components of an embodiment of a see-through, augmented or mixed reality display device system. System 8 includes a see-through display device as a near-eye, head mounted display device 2 in communication with a processing unit 4 via a wire 6 in this example or wirelessly in other examples. The see-through, near-eye display device 2 is one example of a head mounted display (HMD).

Figure 7:
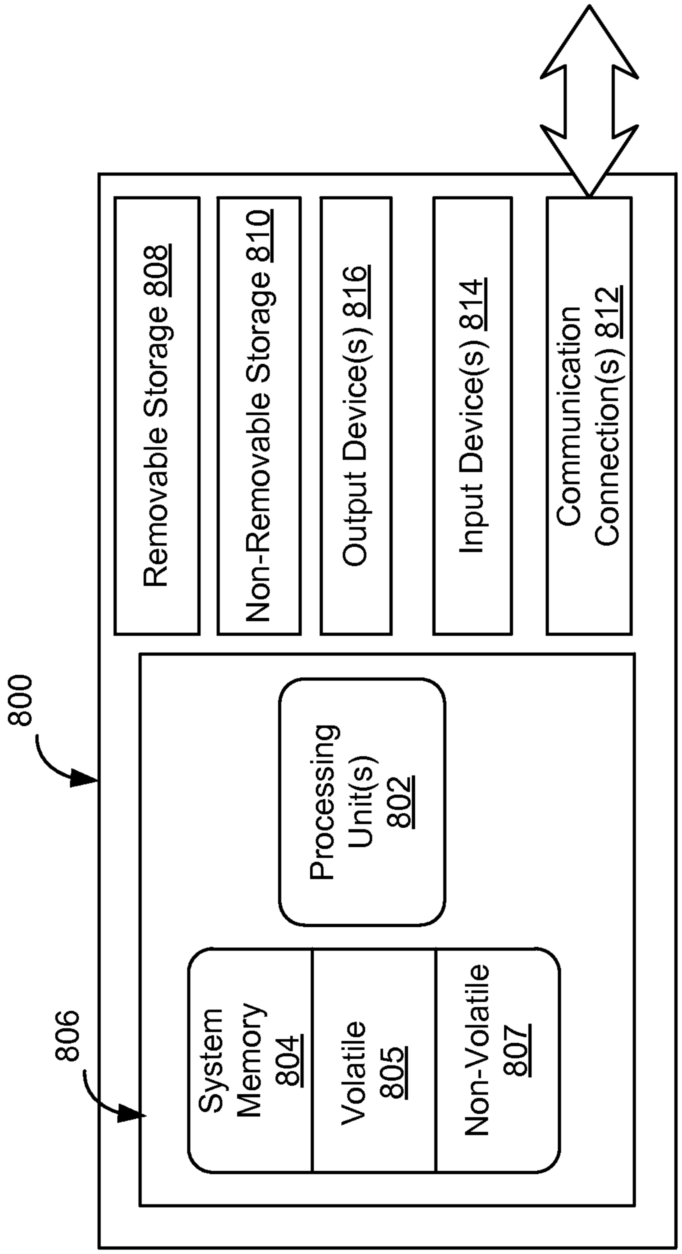
FIG. 7 is a block diagram of one embodiment of a computing system that can be used to implement a network accessible computing system.

A remote, network accessible computer system 12 may be leveraged for processing power and remote data access. An application may be executing on computing system 12 which interacts with or performs processing for display system 8, or may be executing on one or more processors in the see-through, mixed reality display system 8. An example of hardware components of a computing system 12 is shown in FIG. 7.

The system 8, possibility with aid of computer system 12, is able to help a user navigate content using a physical object 11. In one embodiment, the physical object 11 includes an ordered sequence of pages, such as a book. In one embodiment, the physical object 11 is a book. The book could be bound such that the order of the pages is fixed. For example, books commonly have glue or some other adhesive to bind the pages. Another technique could be used to fix the order of the pages. In one embodiment, the physical object 11 is a binder having pages. The binder helps to keep the pages ordered, but the order of the pages could be altered at some point. Another technique for binding the pages is to use a staple, paper clip, or other fastener. In one embodiment, the physical object 11 includes a number of cards or simply loose papers. Herein numerous examples will be provided in which the physical object 11 is a book having pages. However, it will be understood that the physical object 11 does not need to be a bound book.

As one example of navigating content, as the user turns pages in a book (an example of a physical object), their contacts in a contact list are presented to them in the HMD 2. Thus, the HMD 2 may be used to present some representation of the content. The content could be presented in the HMD 2 such that it appears to the user as if it is displayed in the book, but that is not required. Also, presenting the content could include playing audio, video, or rendering 2D/3D imagery.

In one embodiment, the physical object 11 has markers that can be identified using the HMD 2. A marker may be any text, symbol, image, etc. that is able to be uniquely identified. The marker could be visible to the human eye, as in text or an image. However, the marker might not be visible to the human eye. For example, the markers could be infrared (IR) retro-reflective markers. A retro-reflective marker is a passive element that reflects IR light when illuminated with IR light.

In one embodiment, the markers are associated with portions of the content to allow the user to navigate the content. For example, as the user turns pages in a book, the markers are identified on the pages and the associated contacts in a contact list are presented in the HMD 2. Many other types of data could be displayed.

The physical object 11 might not contain any visible elements. As noted, the markers may be (IR) retro-reflective markers. On the other hand the physical object 11 might have visible text in it that serves as the markers. This text need not be related to the content to be navigated at all. For example, the text of any book could serve as the markers. Note that the markers may be used for whatever content the user wants to navigate. For example, any ordered data set could be navigated, in accordance with one embodiment.

Thus, note that the physical object 11 may be used to navigate different data sets, such as ordered data sets. For example, the same physical object 11 may be used to navigate a user's contact list, their list of audio albums, media files, emails, list of purchase orders, 3D models of items in a catalog, etc.

In FIG. 1A, head mounted display device 2 is in the shape of eyeglasses in a frame 115, with a display optical system 14 for each eye in which image data is projected into a user's eye to generate a display of the image data while a user also sees through the display optical systems 14 for an actual direct view of the real world.

The use of the term "actual direct view" refers to the ability to see real world objects directly with the human eye, rather than seeing created image representations of the objects. For example, looking through glass at a room allows a user to have an actual direct view of the room, while viewing a video of a room on a television is not an actual direct view of the room. Each display optical system 14 is also referred to as a see-through display, and the two display optical systems 14 together may also be referred to as a see-through display.

Frame 115 provides a support structure for holding elements of the system in place as well as a conduit for electrical connections. In this embodiment, frame 115 provides a convenient eyeglass frame as support for the elements of the system discussed further below. The frame 115 includes a nose bridge portion 104 with a microphone 110 for recording sounds and transmitting audio data in this embodiment. A temple or side arm 102 of the frame rests on each of a user's ears. In this example, the right temple 102 includes control circuitry 136 for the display device 2. The HMD 2 may also include an audio transducer for presenting audio signals.

Figure 2A:
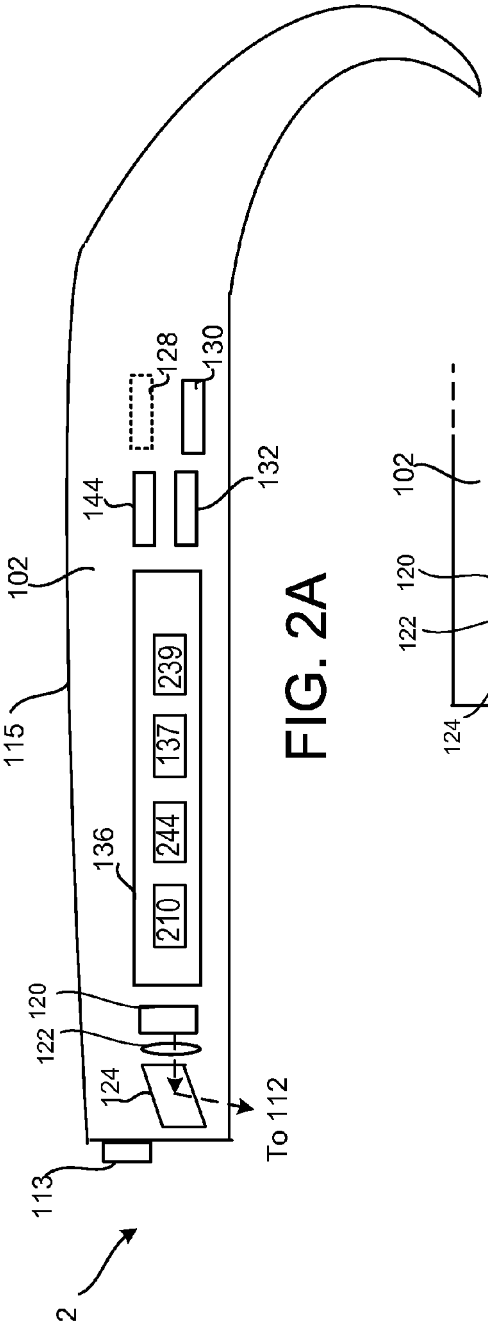
FIG. 2A is a side view of an eyeglass temple of a frame in an embodiment of the see-through, mixed reality display device embodied as eyeglasses providing support for hardware and software components.
Figure 2B:
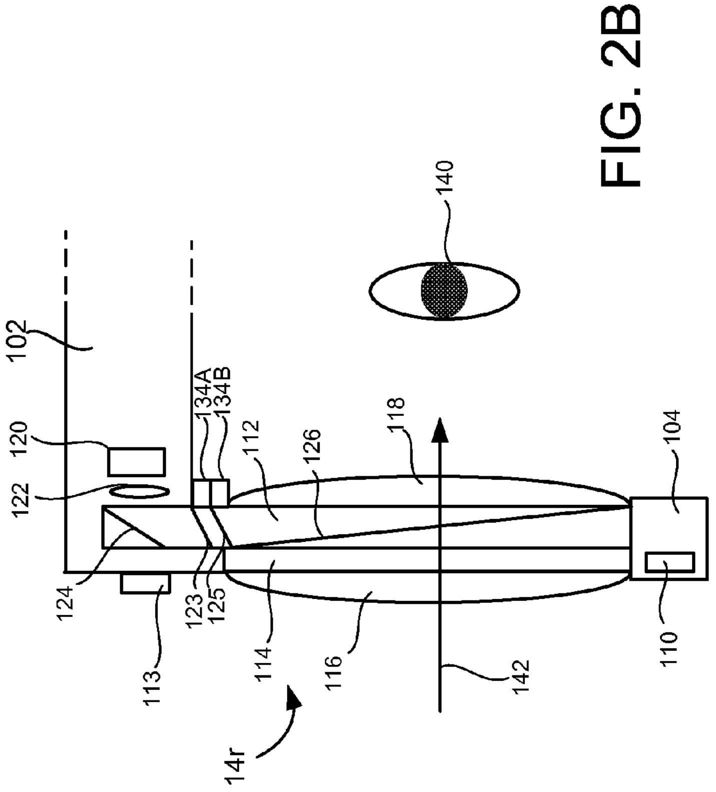
FIG. 2B is a top view of an embodiment of a display optical system of a see-through, near-eye, mixed reality device.

As illustrated in FIGS. 2A and 2B, an image generation unit 120 is included on each temple 102 in this embodiment as well. Also, not shown in the view of FIG. 1A, but illustrated in FIGS. 2A and 2B are outward facing cameras 113 for recording digital images and videos and transmitting the visual recordings to the control circuitry 136 which may in turn send the captured image data to the processing unit 4 which may also send the data to one or more computer systems 12 over a network 50.

The processing unit 4 may take various embodiments. In some embodiments, processing unit 4 is a separate unit which may be worn on the user's body, e.g. a wrist, or be a separate device like the illustrated mobile device 4 as illustrated in FIG. 1C. The processing unit 4 may communicate wired or wirelessly (e.g., WiFi, Bluetooth, infrared, RFID transmission, wireless Universal Serial Bus (WUSB), cellular, 3G, 4G or other wireless communication means) over a communication network 50 to one or more computing systems 12 whether located nearby or at a remote location. In other embodiments, the functionality of the processing unit 4 may be integrated in software and hardware components of the display device 2 as in FIG. 1B.

Figure 1B:
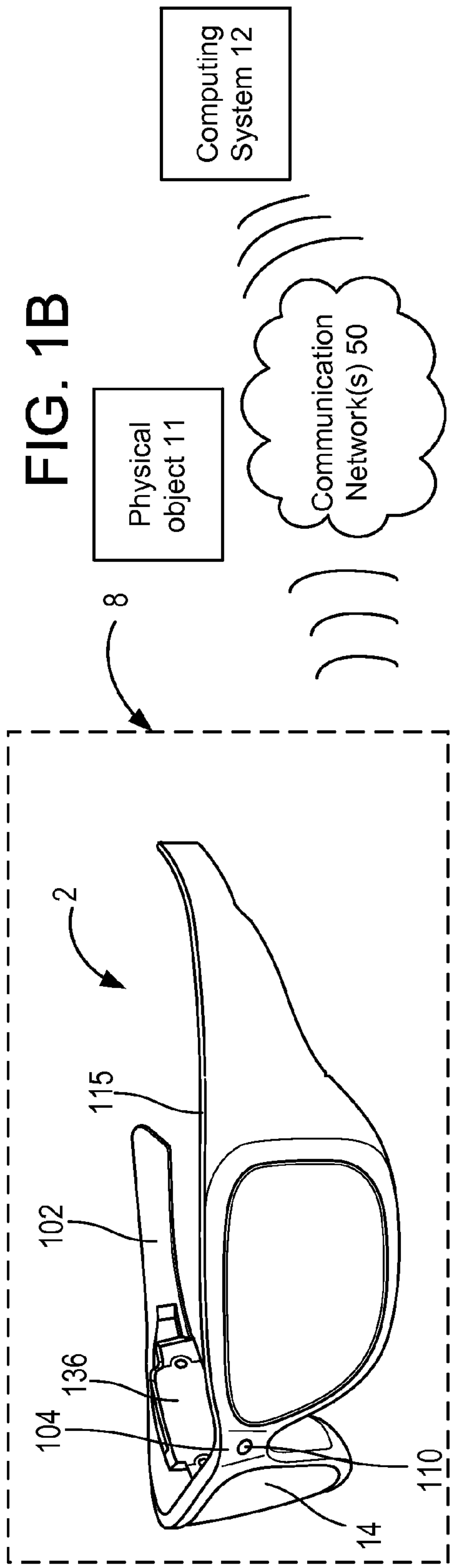
FIG. 1B is a block diagram depicting example components of another embodiment of a see-through, mixed reality display device system.
Figure 1C:
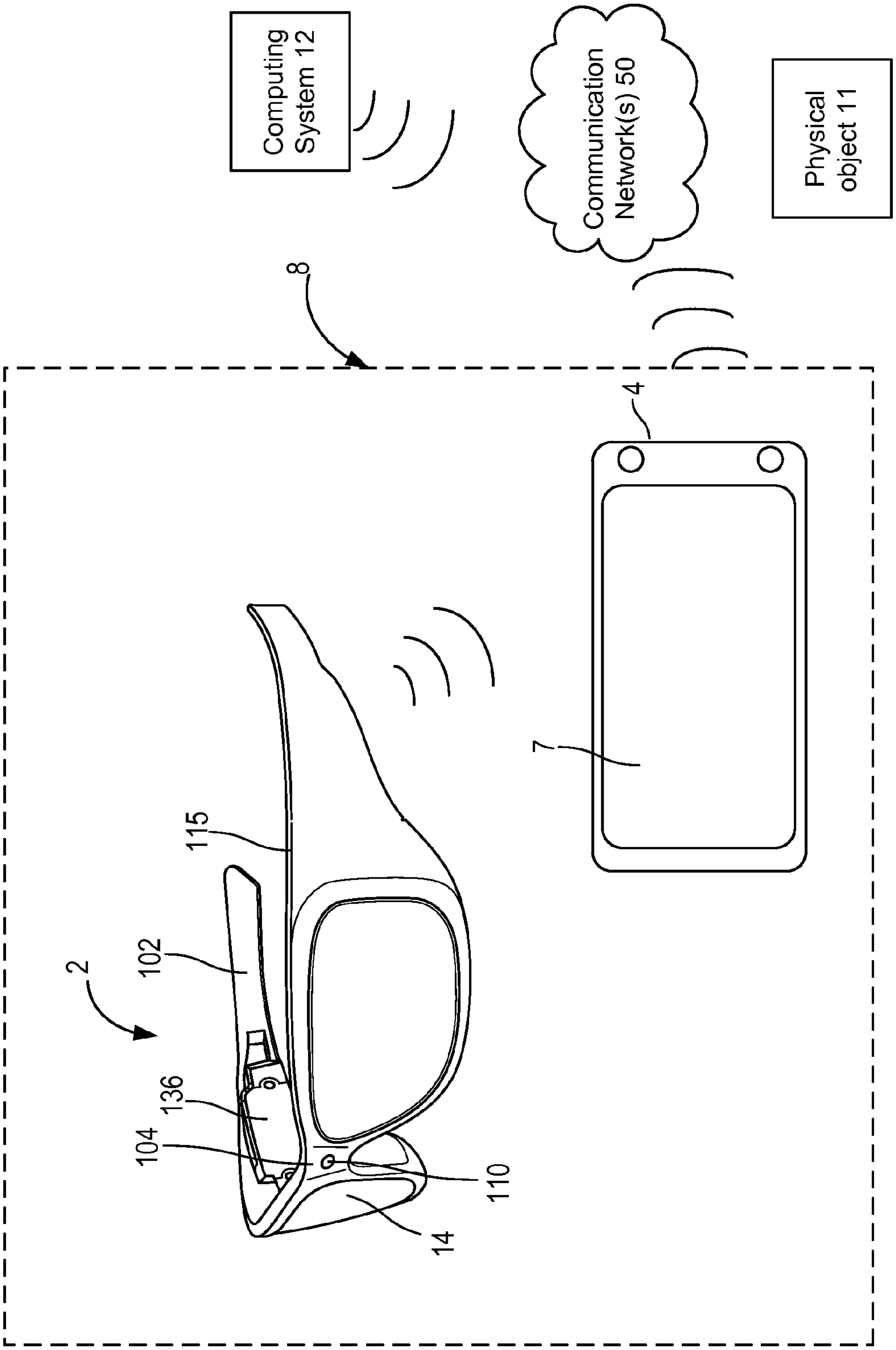
FIG. 1C is a block diagram depicting example components of another embodiment of a see-through, mixed reality display device system using a mobile device as a processing unit.

FIG. 1B is a block diagram depicting example components of another embodiment of a see-through, augmented or mixed reality display device system 8 which may communicate over a communication network 50 with other devices. In this embodiment, the control circuitry 136 of the display device 2 communicates wirelessly via a wireless transceiver (see 137 in FIG. 2A) over a communication network 50 to one or more computer systems 12.

FIG. 1C is a block diagram of another embodiment of a see-through, mixed reality display device system using a mobile device as a processing unit 4. Examples of hardware and software components of a mobile device 4 such as may be embodied in a smartphone or tablet computing device are described in FIG. 8. A display 7 of the mobile device 4 may also display data, for example menus, for executing applications and be touch sensitive for accepting user input. Some other examples of mobile devices 4 are a smartphone, a laptop or notebook computer, and a netbook computer.

FIG. 2A is a side view of an eyeglass temple 102 of the frame 115 in an embodiment of the see-through, mixed reality display device 2 embodied as eyeglasses providing support for hardware and software components. At the front of frame 115 is physical environment facing video camera 113 that can capture video and still images of the real world to map real objects in the field of view of the see-through display, and hence, in the field of view of the user. The cameras are also referred to as outward facing cameras meaning facing outward from the user's head. Each front facing camera 113 is calibrated with respect to a reference point of its respective display optical system 14 such that the field of view of the display optical system 14 can be determined from the image data captured by the respective camera 113. One example of such a reference point is an optical axis (see 142 in FIG. 2B) of its respective display optical system 14. The image data is typically color image data.

In many embodiments, the two cameras 113 provide overlapping image data from which depth information for objects in the scene may be determined based on stereopsis. In some examples, the cameras may also be depth sensitive cameras which transmit and detect infrared light from which depth data may be determined. The processing identifies and maps the user's real world field of view. Some examples of depth sensing technologies that may be included on the head mounted display device 2 without limitation are SONAR, LIDAR, Structured Light, and/or Time of Flight.

Control circuits 136 provide various electronics that support the other components of head mounted display device 2. In this example, the right temple 102*r* includes control circuitry 136 for the display device 2 which includes a processing unit 210, a memory 244 accessible to the processing unit 210 for storing processor readable instructions and data, a wireless interface 137 communicatively coupled to the processing unit 210, and a power supply 239 providing power for the components of the control circuitry 136 and the other components of the display 2 like the cameras 113, the microphone 110 and the sensor units discussed below. The processing unit 210 may comprise one or more processors including a central processing unit (CPU) and a graphics processing unit (GPU).

Inside, or mounted to temple 102, are ear phones 130, inertial sensors 132, one or more location or proximity sensors 144, some examples of which are a GPS transceiver, an infrared (IR) transceiver, or a radio frequency transceiver for processing RFID data. Optional electrical impulse sensor 128 detects commands via eye movements. In one embodiment, inertial sensors 132 include a three axis magnetometer 132A, three axis gyro 132B and three axis accelerometer 132C. The inertial sensors are for sensing position, orientation, and sudden accelerations of head mounted display device 2. From these movements, head position may also be determined. In this embodiment, each of the devices using an analog signal in its operation like the sensor devices 144, 128, 130, and 132 as well as the microphone 110 and an IR illuminator 134A discussed below, include control circuitry which interfaces with the digital processing unit 210 and memory 244 and which produces and converts analog signals for its respective device.

Mounted to or inside temple 102 is an image source or image generation unit 120 which produces visible light representing images. In one embodiment, the image source includes micro display 120 for projecting images of one or more virtual objects and coupling optics lens system 122 for directing images from micro display 120 to reflecting surface or element 124. The microdisplay 120 may be implemented in various technologies including transmissive projection technology, micro organic light emitting diode (OLED) technology, or a reflective technology like digital light processing (DLP), liquid crystal on silicon (LCOS) and Mirasol® display technology from Qualcomm, Inc. The reflecting surface 124 directs the light from the micro display 120 into a lightguide optical element 112, which directs the light representing the image into the user's eye. Image data of a virtual object may be registered to a real object meaning the virtual object tracks its position to a position of the real object seen through the see-through display device 2 when the real object is in the field of view of the see-through displays 14.

In some embodiments, the physical object 11 has markers. For example, a photograph in a magazine may be printed with IR retro-reflective markers. An IR unit 144 may detect the marker and send the data it contains to the control circuitry 136.

FIG. 2B is a top view of an embodiment of one side of a see-through, near-eye, mixed reality display device including a display optical system 14. A portion of the frame 115 of the near-eye display device 2 will surround a display optical system 14 for providing support and making electrical connections. In order to show the components of the display optical system 14, in this case 14*r* for the right eye system, in the head mounted display device 2, a portion of the frame 115 surrounding the display optical system is not depicted.

In the illustrated embodiment, the display optical system 14 is an integrated eye tracking and display system. The system includes a light guide optical element 112, opacity filter 114, and optional see-through lens 116 and see-through lens 118. The opacity filter 114 for enhancing contrast of virtual imagery is behind and aligned with optional see-through lens 116, lightguide optical element 112 for projecting image data from the microdisplay 120 is behind and aligned with opacity filter 114, and optional see-through lens 118 is behind and aligned with lightguide optical element 112. More details of the light guide optical element 112 and opacity filter 114 are provided below.

Light guide optical element 112 transmits light from micro display 120 to the eye 140 of the user wearing head mounted, display device 2. Light guide optical element 112 also allows light from in front of the head mounted, display device 2 to be transmitted through light guide optical element 112 to eye 140, as depicted by arrow 142 representing an optical axis of the display optical system **14*r*, thereby allowing the user to have an actual direct view of the space in front of head mounted, display device 2 in addition to receiving a virtual image from micro display 120. Thus, the walls of light guide optical element 112 are see-through. Light guide optical element 112 includes a first reflecting surface 124 (e.g., a mirror or other surface). Light from micro display 120 passes through lens 122 and becomes incident on reflecting surface 124. The reflecting surface 124 reflects the incident light from the micro display 120 such that light is trapped inside a waveguide, a planar waveguide in this embodiment. A representative reflecting element 126 represents the one or more optical elements like mirrors, gratings, and other optical elements which direct visible light representing an image from the planar waveguide towards the user eye 140**.

Infrared illumination and reflections, also traverse the planar waveguide 112 for an eye tracking system 134 for tracking the position of the user's eyes. The position of the user's eyes and image data of the eye in general may be used for applications such as gaze detection, blink command detection and gathering biometric information indicating a personal state of being for the user. The eye tracking system 134 comprises an eye tracking illumination source 134A and an eye tracking IR sensor 134B positioned between lens 118 and temple 102 in this example. In one embodiment, the eye tracking illumination source 134A may include one or more infrared (IR) emitters such as an infrared light emitting diode (LED) or a laser (e.g. VCSEL) emitting about a predetermined IR wavelength or a range of wavelengths. In some embodiments, the eye tracking sensor 134B may be an IR camera or an IR position sensitive detector (PSD) for tracking glint positions.

The use of a planar waveguide as a light guide optical element 112 in this embodiment allows flexibility in the placement of entry and exit optical couplings to and from the waveguide's optical path for the image generation unit 120, the illumination source 134A and the IR sensor 134B. In this embodiment, a wavelength selective filter 123 passes through visible spectrum light from the reflecting surface 124 and directs the infrared wavelength illumination from the eye tracking illumination source 134A into the planar waveguide 112 through wavelength selective filter 125 passes through the visible illumination from the micro display 120 and the IR illumination from source 134A in the optical path heading in the direction of the nose bridge 104. Reflective element 126 in this example is also representative of one or more optical elements which implement bidirectional infrared filtering which directs IR illumination towards the eye 140, preferably centered about the optical axis 142 and receives IR reflections from the user eye 140. Besides gratings and such mentioned above, one or more hot mirrors may be used to implement the infrared filtering. In this example, the IR sensor 134B is also optically coupled to the wavelength selective filter 125 which directs only infrared radiation from the waveguide including infrared reflections of the user eye 140, preferably including reflections captured about the optical axis 142, out of the waveguide 112 to the IR sensor 134B.

In other embodiments, the eye tracking unit optics are not integrated with the display optics. For more examples of eye tracking systems for HMD devices, see U.S. Pat. No. 7,401,920, entitled "Head Mounted Eye Tracking and Display System," issued Jul. 22, 2008 to Kranz et al., which is incorporated herein by reference.

Another embodiment for tracking the direction of the eyes is based on charge tracking. This concept is based on the observation that a retina carries a measurable positive charge and the cornea has a negative charge. Sensors 128, in some embodiments, are mounted by the user's ears (near earphones 130) to detect the electrical potential while the eyes move around and effectively read out what the eyes are doing in real time. Eye blinks may be tracked as commands. Other embodiments for tracking eyes movements such as blinks which are based on pattern and motion recognition in image data from the small eye tracking camera 134B mounted on the inside of the glasses, can also be used. The eye tracking camera 134B sends buffers of image data to the memory 244 under control of the control circuitry 136.

Opacity filter 114, which is aligned with light guide optical element 112, selectively blocks natural light from passing through light guide optical element 112 for enhancing contrast of virtual imagery. When the system renders a scene for the mixed reality display, it takes note of which real-world objects are in front of which virtual objects and vice versa. If a virtual object is in front of a real-world object, then the opacity is turned on for the coverage area of the virtual object. If the virtual object is (virtually) behind a real-world object, then the opacity is turned off, as well as any color for that display area, so the user will only see the real-world object for that corresponding area of real light. The opacity filter assists the image of a virtual object to appear more realistic and represent a full range of colors and intensities. In this embodiment, electrical control circuitry for the opacity filter, not shown, receives instructions from the control circuitry 136 via electrical connections routed through the frame.

Again, FIGS. 2A and 2B only show half of the head mounted display device 2. A full head mounted display device would include another set of optional see-through lenses 116 and 118, another opacity filter 114, another light guide optical element 112, another micro display 120, another lens system 122 physical environment facing camera 113 (also referred to as outward facing or front facing camera 113), eye tracking assembly 134, earphones 130, and sensors 128 if present. Additional details of a head mounted display 2 are illustrated in U.S. patent application Ser. No. 12/905,952 entitled Fusing Virtual Content Into Real Content, Filed Oct. 15, 2010, which is hereby incorporated by reference.

Figure 3:
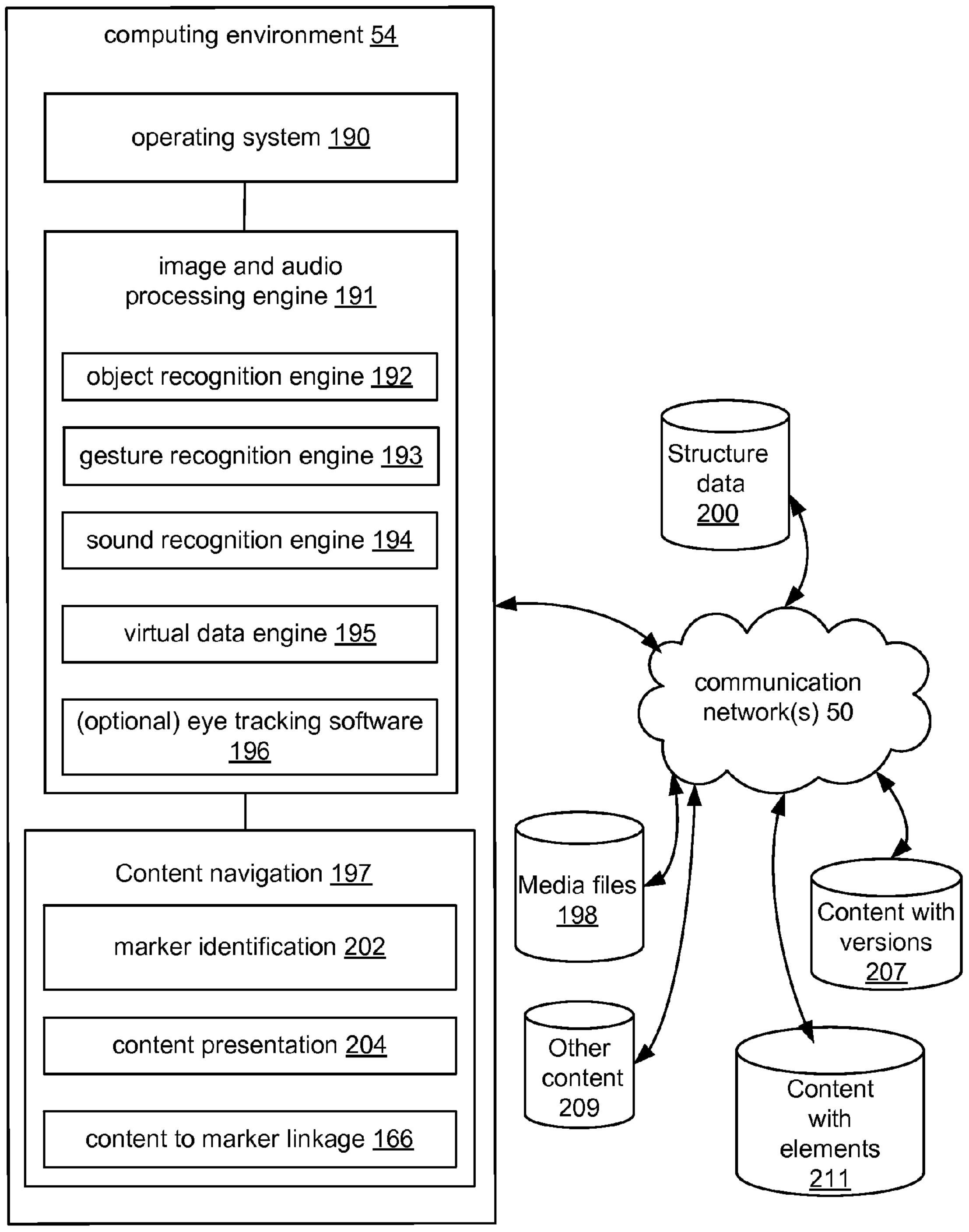
FIG. 3 is a block diagram of a system from a software perspective for providing a mixed reality user interface by a see-through, mixed reality display device system in which software for navigating content using a physical object.

FIG. 3 illustrates a computing environment embodiment from a software perspective which may be implemented by the display device system 8, a remote computing system 12 in communication with the display device system or both. Network connectivity allows leveraging of available computing resources. The computing environment 54 may be implemented using one or more computer systems. As shown in the embodiment of FIG. 3, the software components of a computing environment 54 include an image and audio processing engine 191 and content navigation 197, in communication with an operating system 190.

Content navigation 197 includes marker identification 202, content presentation 204, and content to marker linkage 166. Content navigation 197 is able to help the user navigate through various content using a physical object 11, such as a book. In one embodiment, content navigation 197 is able to present an interface to the user for selecting what content to navigate.

Marker identification 202 is able to identify markers in the physical object 11. Marker identification 202 may use any type of data to identify the markers. In some embodiments, the marker identification 202 identifies reflected light. In one embodiment, marker identification 202 uses light intensity values in image data. The image data could be RGB data, which can allow identification of text, symbols, images, etc. In one embodiment, marker identification 202 uses IR data to detect, for example, retro-reflective markers. In one embodiment, the marker includes light source, such as an LED. Thus, marker identification 202 is able to detect a light pattern from an LED or other light source, in one embodiment. Marker identification 202 may communicate with image processing and audio engine 191 to detect the markers.

Content presentation 204 is able to present content being navigated by the user in response to markers being detected. The content can be presented in the HMD 2. As one example, a hologram is presented in the HMD 2. The content could also be audio.

Content to marker linkage 166 is able to determine how to link content to markers in the physical object 11. For example, the physical object 11 may be a book containing a fixed number of pages. As one possibility, there may be a marker on each page. The content to marker linkage 166 is able to analyze the content and determine how to link it to each marker. As one example, the content to marker linkage 166 determines how to link a list of contacts to each marker. As another example, the content to marker linkage 166 determines how to link a video file to each marker.

Examples of the content include, but are not limited to, media files 198, content with versions 207, content with elements 211, and other content 209. This content could be stored anywhere. The processing unit 4 of the HMD 2 has some amount of storage that could be used. However, the content may well be external to the system 8. As one example, the content is on another electronic device, such as a cellular telephone, laptop computer, notepad computer, etc. Also, as previously noted, processing unit 4 of the system 8 could itself be a device such as a cellular telephone, laptop computer, notepad computer, etc. The content could be on (or accessible to) a server that is accessible over, for example, the Internet. A media file 198 could include a digital or analog file that may contain audio and/or visual data. Visual data could include video or images. As one example, the user can "scrub" through a video file by paging through a book (an example of a physical object). Note that in this example, the user could advance through the content by a certain amount of time for each page turn, as one example. In this case, the frames (or batches of frames) of video or samples of audio data may be considered to be a set of ordered records. As noted herein, embodiments allow the user to search through large sets of ordered records.

Many types of content can be broken down into various elements, as represented by content with elements 211. For example, each contact in a user's contact list can be considered to be an element. In this example, each turn of the page could advance the content by one contact. However, a different level of granularity could be used. Each page turn could show "n" contacts, where "n" is any positive integer. As another example, each page could contain all contacts with a letter of the alphabet. If there are too many contacts for a particular letter, then the contacts for that letter could be spread over multiple pages.

Some content has different versions, as represented by content with versions 207. For example, a document under revision may have any number of revisions. In one embodiment, each page of each version of the document is linked to one marker. The first marker could be page 1 of revision 1; the second marker could be page 1 of revision 2, etc. Thus, the user is able to advance through by revision by, for example, paging through a book.

Many other types of content may be navigated, which is represented by other content 209.

Image and audio processing engine 191 includes object recognition engine 192, gesture recognition engine 193, sound recognition engine 194, virtual data engine 195, and, optionally eye tracking software 196 if eye tracking is in use, all in communication with each other. Image and audio processing engine 191 processes video, image, and audio data received from a capture device such as the outward facing cameras 113. To assist in the detection and/or tracking of objects, an object recognition engine 192 of the image and audio processing engine 191 may access one or more databases of structure data 200 over one or more communication networks 50.

Virtual data engine 195 processes virtual objects and registers the position and orientation of virtual objects in relation to one or more coordinate systems. Additionally, the virtual data engine 195 performs the translation, rotation, scaling and perspective operations using standard image processing methods to make the virtual object appear realistic. A virtual object position may be registered or dependent on a position of a corresponding real object. The virtual data engine 195 determines the position of image data of a virtual object in display coordinates for each display optical system 14. The virtual data engine 195 may also determine the position of virtual objects in various maps of a real-world environment stored in a memory unit of the display device system 8 or of the computing system 12. One map may be the field of view of the display device with respect to one or more reference points for approximating the locations of the user's eyes. For example, the optical axes of the see-through display optical systems 14 may be used as such reference points. In other examples, the real-world environment map may be independent of the display device, e.g. a 3D map or model of a location (e.g. store, coffee shop, museum).

One or more processors of the computing system 12, or the display device system 8 or both also execute the object recognition engine 192 to identify real objects in image data captured by the environment facing cameras 113. For example, the object recognition engine 192 may implement pattern recognition based on structure data 200 to detect particular objects including a human. The object recognition engine 192 may also include facial recognition software which is used to detect the face of a particular person.

Structure data 200 may include structural information about targets and/or objects to be tracked. For example, a skeletal model of a human may be stored to help recognize body parts. In another example, structure data 200 may include structural information regarding one or more inanimate objects, such as a book, in order to help recognize the one or more inanimate objects. The structure data 200 may store structural information as image data or use image data as references for pattern recognition. The image data may also be used for facial recognition.

As printed material typically includes text, the structure data 200 may include one or more image datastores including images of numbers, symbols (e.g. mathematical symbols), letters and characters from alphabets used by different languages. Additionally, structure data 200 may include handwriting samples of the user for identification. Based on the image data, the marker identification 202 can identify various markers in a physical object.

The sound recognition engine 194 processes audio received via microphone 110.

The outward facing cameras 113 in conjunction with the gesture recognition engine 193 implements a natural user interface (NUI) in embodiments of the display device system 8. Blink commands or gaze duration data identified by the eye tracking software 196 are also examples of physical action user input. Voice commands may also supplement other recognized physical actions such as gestures and eye gaze.

The gesture recognition engine 193 can identify actions performed by a user indicating a control or command to an executing application. The action may be performed by a body part of a user, e.g., a hand or finger in some applications, but also an eye blink sequence of an eye can be gestures. In one embodiment, the gesture recognition engine 193 includes a collection of gesture filters, each comprising information concerning a gesture that may be performed by at least a part of a skeletal model. The gesture recognition engine 193 compares a skeletal model and movements associated with it derived from the captured image data to the gesture filters in a gesture library to identify when a user (as represented by the skeletal model) has performed one or more gestures. In some examples, a camera, in particular a depth camera in the real environment separate from the display device 2 in communication with the display device system 8 or a computing system 12 may detect the gesture and forward a notification to the system 8, 12. In other examples, the gesture may be performed in view of the cameras 113 by a body part such as the user's hand or one or more fingers.

In some examples, matching of image data to image models of a user's hand or finger during gesture training sessions may be used rather than skeletal tracking for recognizing gestures.

More information about the detection and tracking of objects can be found in U.S. patent application Ser. No. 12/641,788, "Motion Detection Using Depth Images," filed on Dec. 18, 2009; and U.S. patent application Ser. No. 12/475,308, "Device for Identifying and Tracking Multiple Humans over Time," both of which are incorporated herein by reference in their entirety. More information about recognizer engine 454 can be found in U.S. Patent Publication 2010/0199230, "Gesture Recognizer System Architecture," filed on Apr. 13, 2009, incorporated herein by reference in its entirety. More information about recognizing gestures can be found in U.S. Patent Publication 2010/0194762, "Standard Gestures," published Aug. 5, 2010, and U.S. Patent Publication 2010/0306713, "Gesture Tool" filed on May 29, 2009, both of which are incorporated herein by reference in their entirety.

The computing environment 54 also stores data in image and audio data buffer(s) 199. The buffers provide memory for receiving image data captured from the outward facing cameras 113, image data from an eye tracking camera of an eye tracking assembly 134 if used, buffers for holding image data of virtual objects to be displayed by the image generation units 120, and buffers for audio data such as voice commands from the user via microphone 110 and instructions to be sent to the user via earphones 130.

Figure 4A:
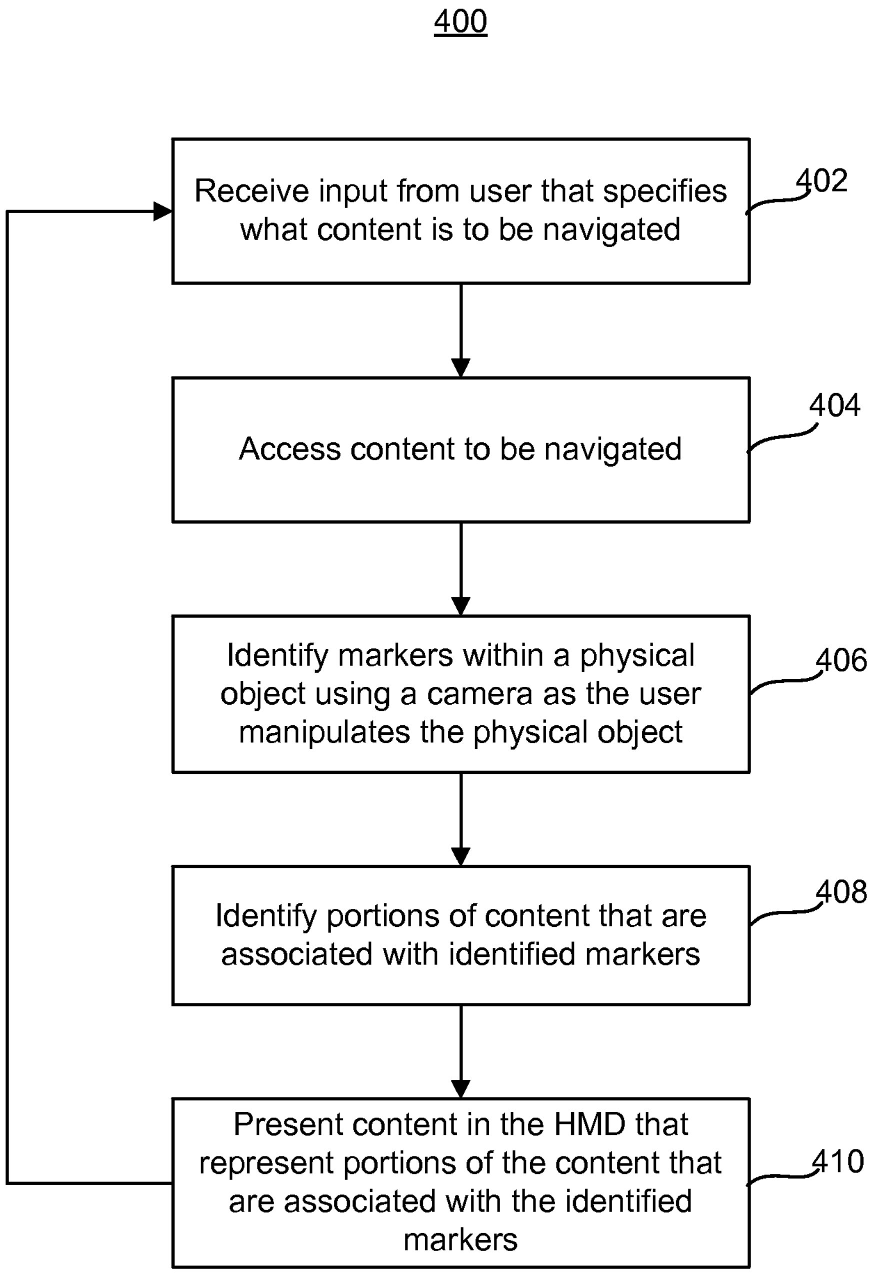
FIG. 4A is a flowchart of one embodiment of a process of navigating through content presented in an HMD using a physical object.

FIG. 4A is a flowchart of one embodiment of a process 400 of navigating through content presented in an HMD 2 using a physical object 11. As noted, the physical object 11 may be used to navigate different data sets. In one embodiment, steps of this process are performed by logic that may include any combination of hardware and/or software. Note that this logic could be spread out over more than one physical device. For example, some of the steps could be performed by logic residing within see-through, near-eye display device 2, and other steps performed by one or more computing devices 4, 12 in communication with the see-through, near-eye display device 2. A computing device may be in communication with the HMD 2 over a network 50, as one possibility.

In step 402, input is received from a user that indicates what content is to be navigated. For example, the user provides input that the physical object 11 is now to be used to navigate their contacts list. This input may be received in any number of ways including, but not limited to, the user selecting the data set from an interface in a navigation application. For example, a content navigation application 197 presents an interface in the HMD 2 that allows the user to select the content. Details of establishing content for navigation are discussed with respect to FIG. 5.

In step 404, content that is to be navigated is accessed. The content may be accessed from any location. As noted above, the content may be on an electronic device other than the HMD 2, such as a cellular telephone, laptop computer, notepad computer, etc. The content could be on (or accessible to) a server that is accessible over, for example, the Internet.

In step 406, markers in (or on) the physical object 11 are identified using a camera as the user manipulates the physical object 11. In one embodiment, the physical object 11 is a book. The book could be bound such that the order of the pages is fixed. For example, books commonly have glue or some other adhesive to bind the pages. Another technique could be used to fix the order of the pages. In one embodiment, the physical object is a binder having pages. The binder helps to keep the pages ordered, but the order of the pages could be altered at some point. Another technique for binding the pages is to use a staple, paper clip, or other fastener. In one embodiment, the physical object includes a number of cards or simply loose papers. If the order of the cards/papers are changed, the content bound to them (by the markers) does not change in one embodiment. Herein numerous examples will be provided in which the physical object is a book having pages. However, it will be understood that the physical object does not need to be a book in the conventional sense, nor does the physical object need to have physical pages in the conventional sense.

Figure 4B:
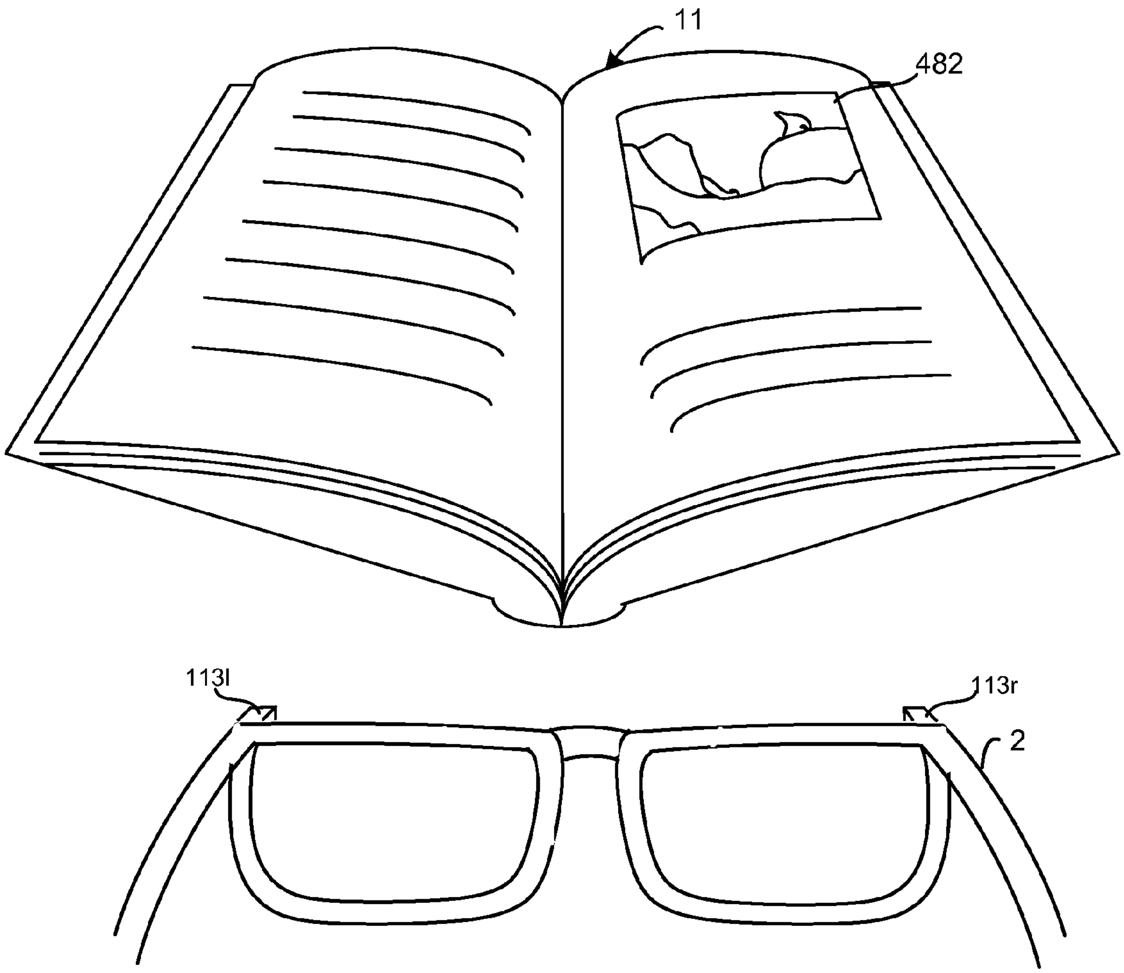
FIG. 4B, FIG. 4C, and FIG. 4D show a physical object having different examples of markers.

The following describes a few examples of markers. FIG. 4B shows a physical object 11 having a marker 482. In this case, the marker is an image. The HMD display device 2 has front facing cameras 113*l* and 113*r* for capturing image data. The cameras 113 may have IR and/or RGB sensors, as two examples. The marker 482 may be identified by comparing it to templates or trained data.

Figure 4C:
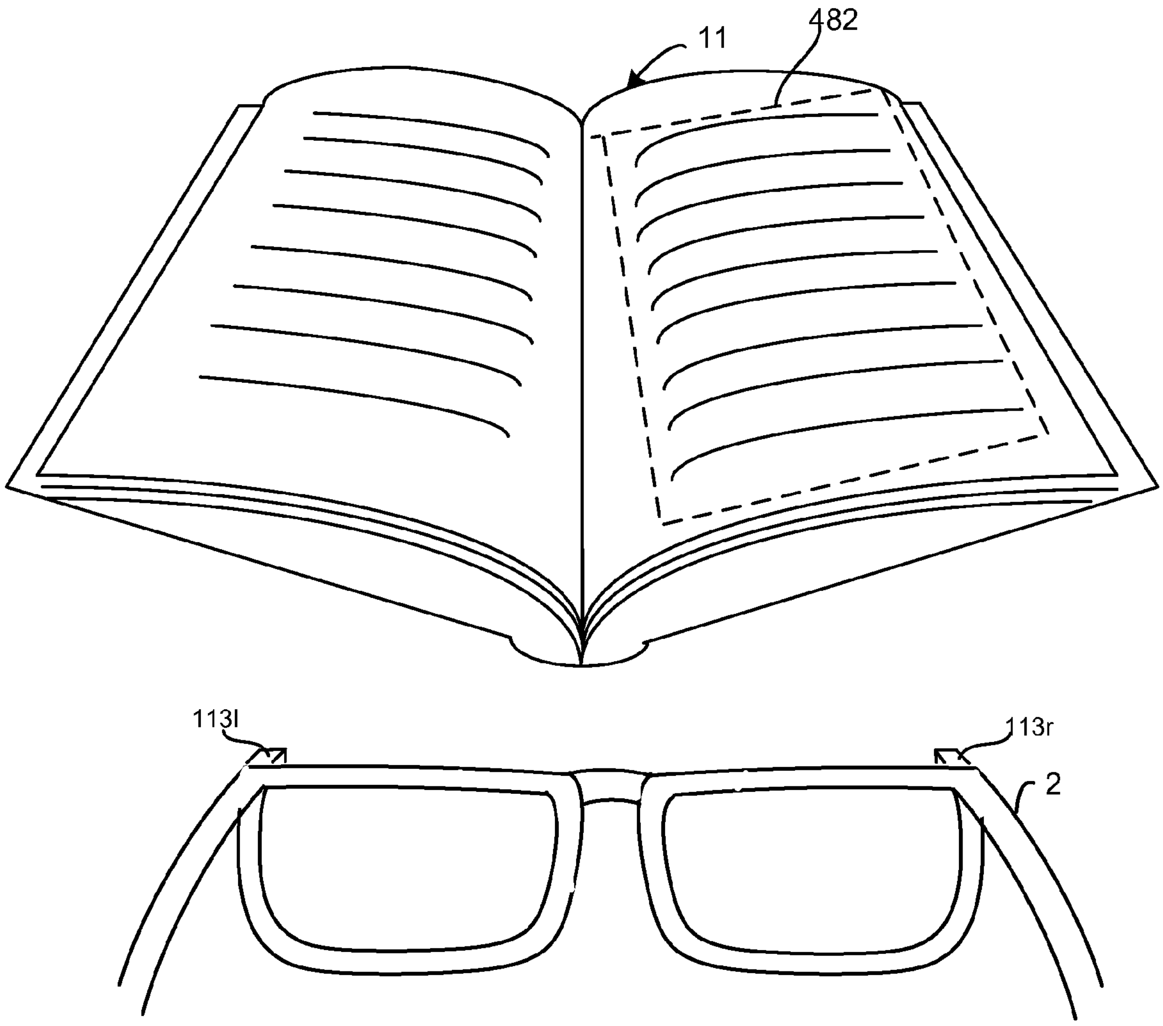

FIG. 4C shows a physical object 11 having a marker 482. In this case, the marker 482 is a block of text. Note that the text may appear to be normal text to the user. The marker 482 may be identified by comparing it to trained data (e.g., by machine vision). The text on the other page of the physical object 11 could also be used as a marker. Also, referring back to FIG. 4B, both the image and the text could be used as separate markers. As another alternative, a marker could be defined using both text and an image.

Figure 4D:
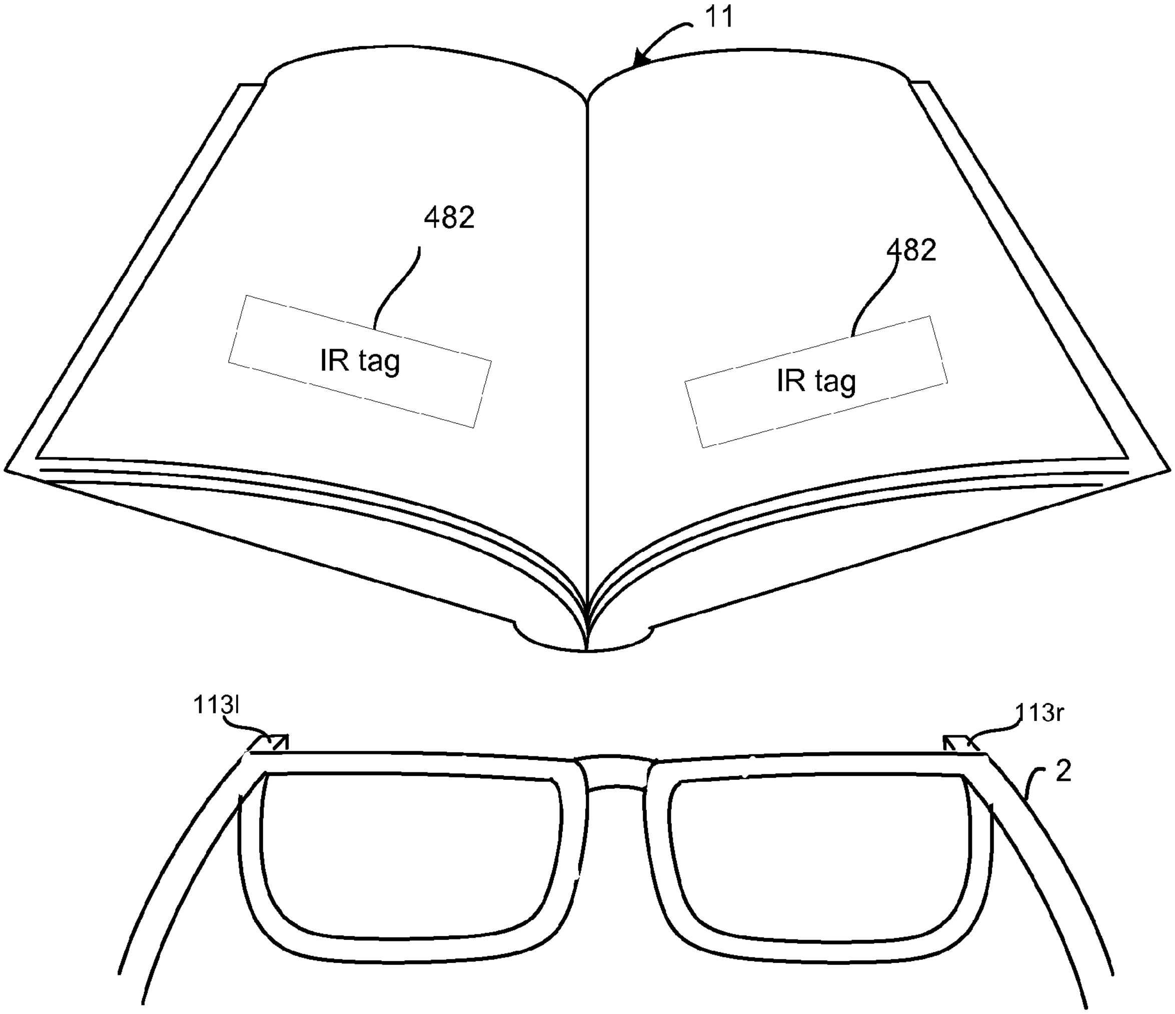

FIG. 4D shows a physical object 11 having two markers 482. In this case, the markers 482 are IR tags. Thus, the cameras 113 may capture IR images. The HMD 2 may have an IR emitter, as well. Note that the IR tags are not visible to the user. Also note that in this case, the book is blank except for the IR tags.

Note that in some cases there is more than one marker that is potentially visible to the camera at one time. For example, a book can have two pages visible at one time. One option is to process both markers at the same time. Thus, later in the process when images are presented in the HMD 2, one image might be presented on each page. As one example, each page would show one contact in a user's contact list.

In one embodiment, having two markers visible allows disambiguation of similar tags. For example, the system might be nearly certain that one marker is marker A. If the system detects that a second marker is either marker B or marker F, it may determine that it must be marker B based on its location relative to marker A.

Another possibility is to have only one marker potentially visible to the camera at one time. For example, the left page could have a marker and the right page not have one.

In step 408, portions of the content that are associated with the identified markers are themselves identified. A brief example is for each contact in a contact list to be associated with a page of the physical object 11.

In step 410, content that represents the identified portions of the content are presented in the HMD 2. In one embodiment, images are presented in the HMD 2 such that they appear as virtual images on the physical object 11. For example, an image appears as a hologram that rests on and possibly extending above the surface of a page of a book. The hologram might appear as being inside (e.g., below) the page. Note that the virtual images do not have to appear to be connected to the physical object 11. For example, the virtual images could appear to be on a table or wall.

Figure 4E:
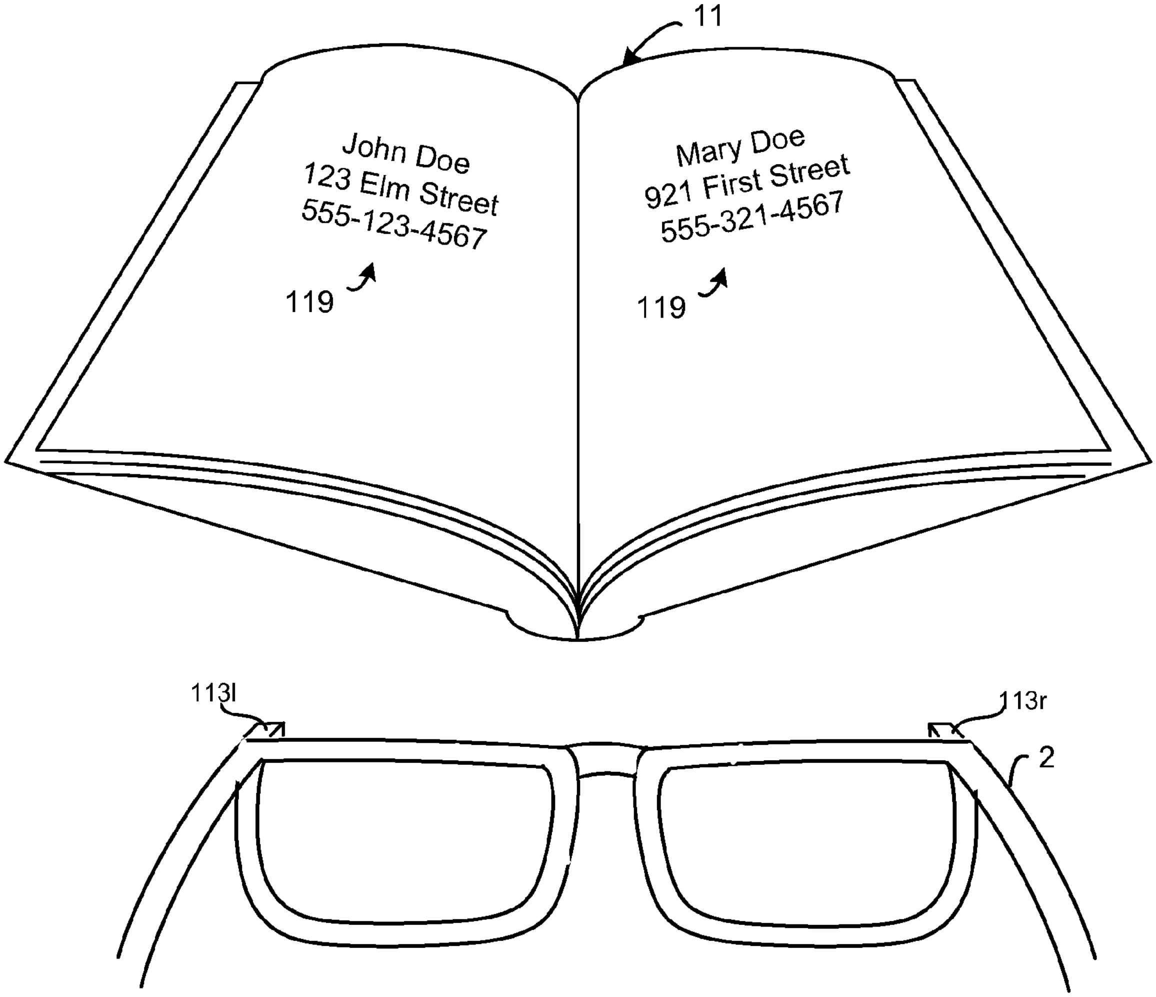
FIG. 4E shows a virtual image presented in an HMD to help a user navigate content using a physical object.

Referring to FIG. 4E, a virtual image 119 is presented in the HMD 2, such that it appears to the user that it is printed on the pages of the book (example of real physical object 11). In this example, each page appears to show one contact from a contact list. Note that the virtual images 119 might seem to rise above the surface of the page, or be located somewhat off from the page. As another example, the virtual images 119 might depict a photograph of the person from the contact list over the page. Many other possibilities exist for presenting the content in the HMD 2.

Also note that the virtual images 119 could be presented such that they are independent of the physical object 11. For example, the images could be presented wherever the user is looking. For example, the user could be looking at a wall instead of the physical object 11. Note that step 410 may include presenting an audio signal. Step 410 may include tracking the eye gaze of the user to determine where the content should appear to be located in the real world.

In one embodiment, content is presented in a display other than an HMD 2 in step 410. For example, the content could be presented on a display screen of a laptop computer, a notepad computer, a cellular telephone, a display screen connected to a personal desktop computer, etc.

After the user is finished navigating through the content for this data set, the user can choose to navigate some other content. This is reflected in process 400, by returning to step 402 to receive further input from the user so that other content can be navigated using the same physical object 11.

Note that when other content is navigated, the way in which the markers are associated with the content could be completely different. For example, when navigating a media file, turning a page in the book may advance the media file by a certain time interval. However, when navigating a contacts list, turning a page in the book may advance by one, two, or a few contacts.

Figure 5:
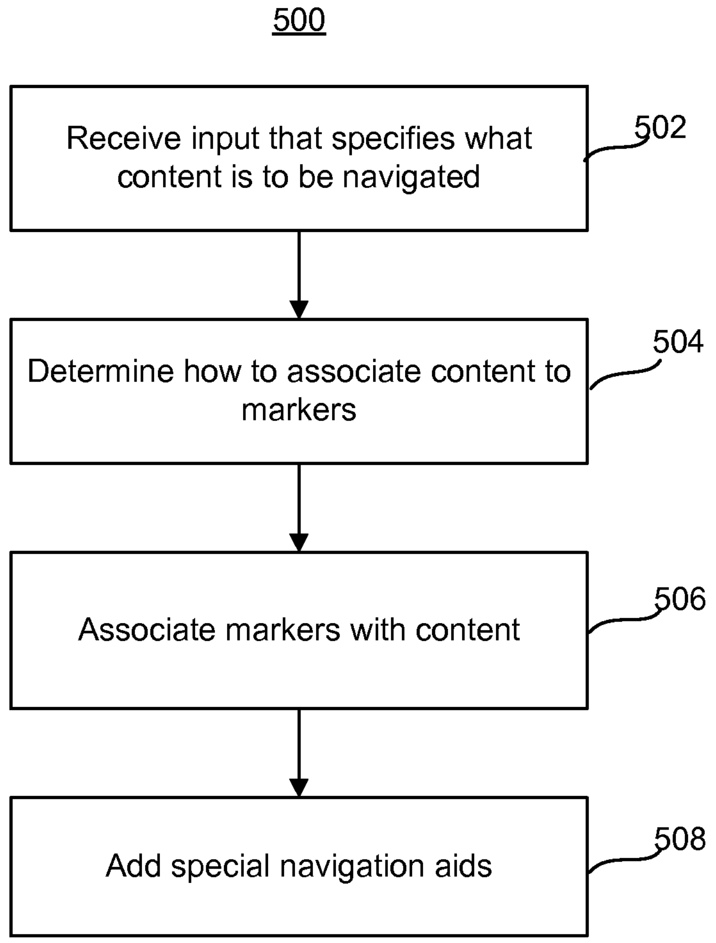
FIG. 5 is a flowchart of one embodiment of a process of establishing content for navigation using a physical object.

FIG. 5 is a flowchart of one embodiment of a process 500 of establishing content for navigation using a physical object 11. This process 500 is one technique for linking the content to markers in the physical object 11 such that later the user is able to use the physical object 11 to navigate the content. Thus, this process 500 may be performed prior to process 400 in FIG. 4. As stated above, the same physical object 11 may be used for navigating different content. Thus, as one option, the physical object 11 and its markers are known prior to process 500.

In one embodiment, steps of this process are performed by logic that may include any combination of hardware and/or software. Note that this logic could be spread out over more than one physical device. For example, some of the steps could be performed by logic residing within see-through, near-eye display device 2, and other steps performed by one or more computing devices 4, 12 in communication with the see-through, near-eye display device 2. A computing device may be in communication with the HMD 2 over a network 50, as one possibility.

In step 502, input is received identifying what content is to be set up for navigating. In one embodiment, a content navigation application 197 is able to interface with another program such as an email, calendar, or contact program. Thus, the user could, for example, request that their contact list be set up for navigating. However, note that the user does not need to make a specific request. In one embodiment, when the user opens their email program this triggers the process to form a binding of emails to pages in the book, as one example. As another example, when a calendar program is opened, this triggers the process of binding days of the month to pages in the book. There could be a relative time binding. For example, "today" is bound to one or more pages, "tomorrow" is bound to one or more pages, etc. As still another example, when a file system browser is open, this triggers the binding of directories to pages in the book. As one further example, the content navigation application 197 could allow the user to specify a media file, such as an audio or audio-visual file that is stored either locally or remotely.

Step 502 may also include accessing that content. As an alternative to accessing the content, some metadata about the content could be accessed. For example, it may not be necessary to access an entire media file since the media file does not need to be played at this time. For an audio file it may be sufficient to know titles and lengths of each song. For an audio-video file it may be sufficient to know how the file is segmented into scenes or the like.

In step 504, a determination is made as to how to associate the content with the markers. In one embodiment, each marker of the physical object 11 is assigned a number. This number may be used for whatever content is to be navigated. In step 504, the content can first be divided in some logical manner. A number may then be assigned to each of the divisions. Thus, each division may be assigned to one of the markers.

In step 506, the markers are associated with the content. The following examples will be used to illustrate. The book may have 300 pages, and thus 300 markers. Note that there may be more than one marker per page, as another alternative. Also, it is not required that each page have a marker.

As one example, the user might have 275 contacts on their contact list. In this case, the contacts could be assigned to markers 1-275. If the user has more contacts than there are markers, then more than one contact could be assigned to a given marker. However, note that some of the markers could be reserved for special navigation aids, such as a table of contents.

As another example, a media file might be 120 minutes long. Dividing 120 minutes into 300 sections equates to 24 second time intervals. In this case, each marker could correspond to a 24 second jump in the media. For example, marker 1 is 0 seconds into the file; marker 2 is 24 seconds into the file, etc.

Many other ways of associating markers to the content are possible in step 506.

In step 508, special navigation aids are added. One example of a navigation aid is a table of contents. This might be assigned to the first marker, but could be anywhere.

Another example of a special navigation aid is to have some embellishment as the user turns the pages in a book. For example, conventional printed books may have chapter headings that delineate where each chapter in a novel or other book starts. Using the example of the contact list, the contacts could be presented in alphabetical order. For example, the letter of the alphabet can be made to appear in the book by presenting a suitable image in the HMD. This could be presented elsewhere than in the book. To be able to know where in the book to present each letter, navigational aids are assigned to markers in one embodiment.

Figure 6A:
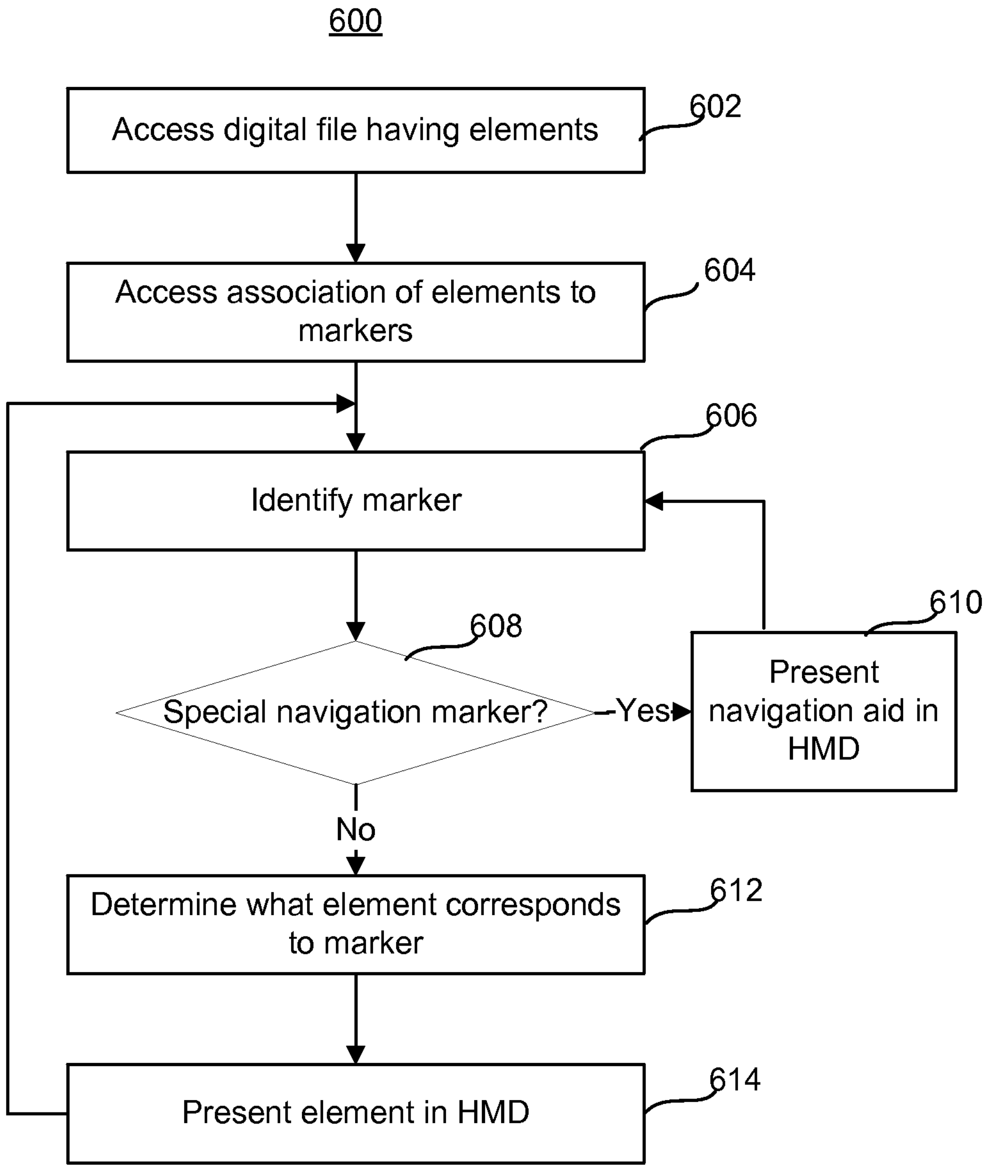
FIG. 6A is a flowchart of one embodiment of a process of using a physical object to navigate a digital file that has elements.

FIG. 6A is a flowchart of one embodiment of a process 600 of using a physical object 11 to navigate a digital file that has elements. One example is a file having a contact list. Process 600 provides further details of one embodiment of process 400 of FIG. 4. In step 602, the digital file is accessed.

In step 604, an association between the elements in the digital file and markers in the physical object 11 is accessed. This association may have been built in process 500 of FIG. 5. As one example, the physical object 11 is a book having an ordered sequence of pages. Each page has one marker, in one embodiment. One or more of the pages could be used for a special navigation page, such as a table of content. Other pages could be used for one or more elements.

In step 606, a marker is identified in the physical object 11, as the user manipulates the physical object 11. Then, a determination is made whether the marker is a special navigation marker, in step 608. If it is, then a special navigation aid is presented in the HMD 2 in step 610. As one example, a table of contents is presented in the HMD 2 to help the user locate content faster. For a contact list, the contacts could be organized alphabetically in the physical object (e.g., a book). The beginning of the book could contain a table of contents with page numbers associated with letters. Thus, the user is able to quickly find the page. As another example, a letter of the alphabet is presented in the HMD 2 to help the user quickly navigate a contact list or other alphabetized list.

Note that special navigation aids can also be presented in the HMD 2 without reference to a certain marker. As one example, the HMD 2 makes it appear that there are tabs on the edges of pages of the book. These tabs can help the user quickly locate a certain letter of the alphabet, as one example. In one embodiment, there is a marker on the cover of the book to help determine the orientation of the closed book. Also, the system knows the thickness of the book in one embodiment to know where to render the tabs. The thickness could be determined by the system using camera data or, alternatively, the thickness might be provided to the system as an input parameter.

If the marker is not a special navigation marker, then it is determined what element in the digital file corresponds to the marker, in step 612. In step 614, an element is presented in the HMD 2 representing the element. Note that a special navigation aid, such as a letter of the alphabet, could be presented on the page with the contact.

Note that in one embodiment, more than one marker is identified at a time. For example, a marker on each of two pages that are open is identified. One element of the digital file could be presented for each marker, in this case. The elements could be presented on the respective pages of the book.

Figure 6B:
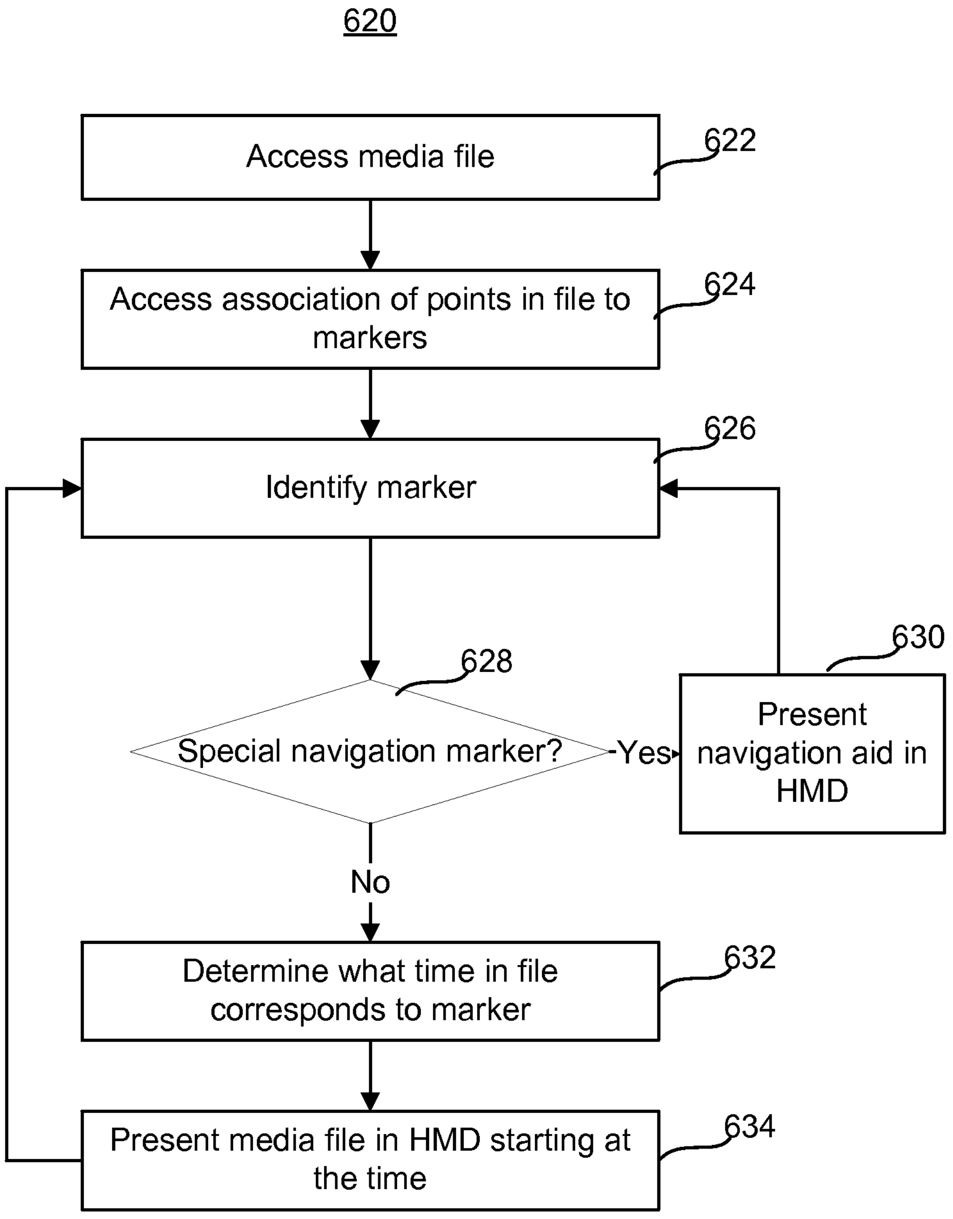
FIG. 6B is a flowchart of one embodiment of a process of using a physical object to navigate a media file.

FIG. 6B is a flowchart of one embodiment of a process 620 of using a physical object 11 to navigate a media file. Process 620 provides further details of one embodiment of process 400 of FIG. 4. In step 622, the media file is accessed.

In step 624, an association between points in the media file and markers in the physical object 11 is accessed. This association may have been built in process 500 of FIG. 5. As one example, the physical object 11 is a book having an ordered sequence of pages. Each page has one marker, in one embodiment. The media file could be associated with the markers based on time. Therefore, the user can advance the media file by some pre-determined time by turning each page.

In step 626, a marker is identified in the physical object 11, as the user manipulates the physical object 11. A determination is made whether the marker is a special navigation marker, in step 628. If it is, then a special navigation aid is presented in the HMD 2 in step 630. One example is to present a table of contents. The table of content may specify what page of the physical object 11 a user should turn to access certain sections of the media file For example, if the media file is a movie, the movie could be broken down into different scenes. The table of contents may specify which page each scene can be found at. Thus, the user will know where to quickly turn to in order to access a particular scene.

If the marker is not a special navigation marker, then the time that corresponds to the marker is determined, in step 632. In step 634, the media file is presented in the HMD 2 starting at the time determined in step 612. Note that process 620 is a way of "scrubbing" through the media file. For example, by flipping through pages of the book, the user is able to quickly scan through the media file for a point of interest.

Another way to associate markers with a media file is by a segment of the media file. Examples of segments are songs on a compact disk, scenes in a movie, and episodes in a disk having multiple episodes of show. Also note that more than one media file, such as a number of compact discs, MP3 files, etc. can be navigated using the physical object 11. For example, the user could scan through their entire collection of music, by flipping through pages of the book.

Figure 6C:
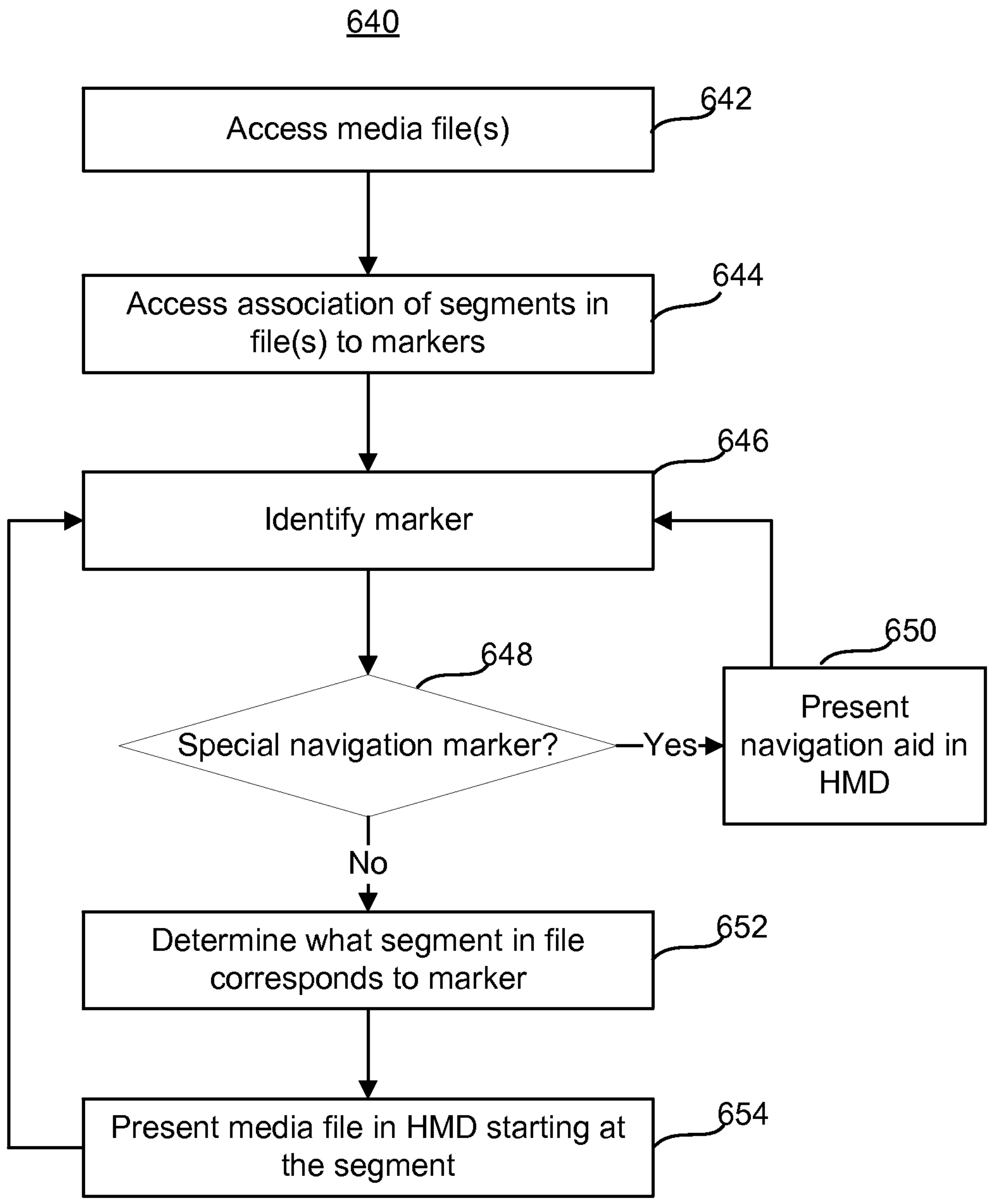
FIG. 6C is a flowchart of one embodiment of a process of using a physical object to navigate a media file (or files) in which markers are associated with segment.

FIG. 6C is a flowchart of one embodiment of a process 640 of using a physical object 11 to navigate a media file (or files) in which markers are associated with segments. Process 640 provides further details of one embodiment of process 400 of FIG. 4. In step 642, the media file(s) is accessed. In step 644, an association between segments of the media file(s) and the markers is identified. Note that the association may take on a hierarchical organization. For example, a page could represent a music album (compact disk, MP3, etc.), followed by pages for each song on the album. This pattern is then repeated for other albums.

In step 646, a marker is identified in the physical object 11, as the user manipulates the physical object 11. A determination is made whether the marker is a special navigation marker, in step 648. If it is, then a special navigation aid is presented in the HMD 2 in step 650. One example is to present a table of contents. The table of content may specify what page of the physical object 11 a user should turn to access a certain segment of the media file(s). For example, if the media file is a movie, the movie could be broken down into different scenes. The table of contents may specify which page each scene can be found at. Thus, the user will know where to quickly turn to in order to access a particular scene. If the user is navigating their music collection, the table of contents could let them know what page a song or album is at.

If the marker is not a special navigation marker, then the segment that corresponds to the marker is determined, in step 652. In step 654, the media file(s) is presented in the HMD 2 starting at the segment determined in step 654. As one example, the user turns to page 85 and a certain song associated with the marker on page 85 starts to play. The HMD 2 might also present some virtual image, such as cover art, concert footage, a music video, etc. As another example, the HMD 2 starts to play a certain scene in a movie that is associated with the marker on the open page in the book. To provide a greater viewing field, the user might look at a wall instead of the book.

Figure 6D:
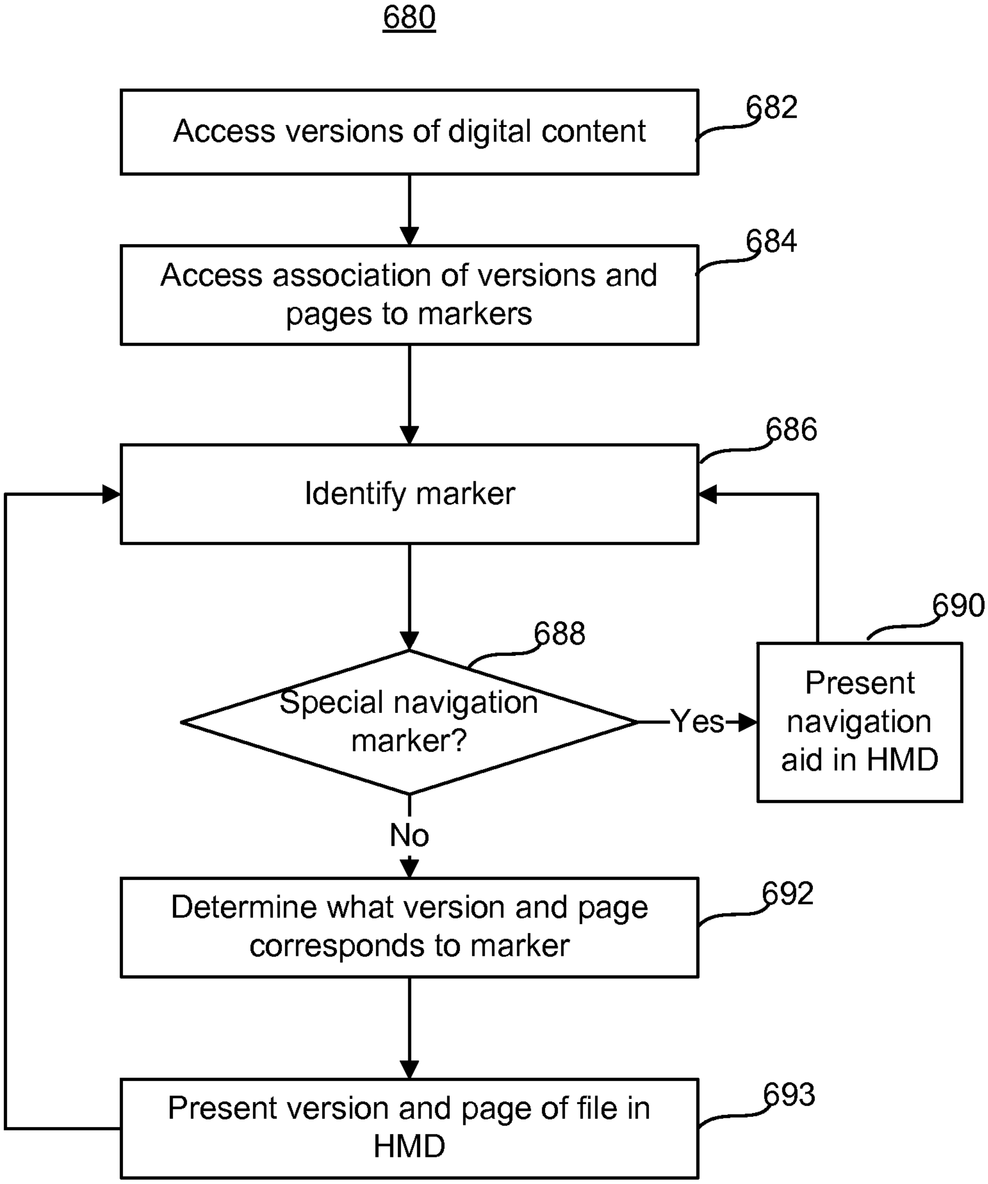
FIG. 6D is a flowchart of one embodiment of a process of using a physical object to navigate different versions of some digital content.

FIG. 6D is a flowchart of one embodiment of a process 680 of using a physical object 11 to navigate different versions of some digital content. As one example, a user is able to turn each page of the book to see the next revision of the digital content.

The process 680 provides further details of one embodiment of process 400 of FIG. 4. In process 680, a marker is associated with a page of a particular version of the digital content. In step 682, the different versions of the digital content are accessed.

In step 684, an association of the links between each marker and a particular page of a particular version of the digital content 11 is accessed. Note that a unit other than a page may be used. As one example, the physical object 11 is a book having an ordered sequence of pages. Each page has one marker, in one embodiment. One or more of the pages could be used for a special navigation page, such as a table of content. Other pages could be used for a page of one of the versions of the digital content.

In step 686, a marker is identified in the physical object 11, as the user manipulates the physical object 11. A determination is made whether the marker is a special navigation marker, in step 688. If it is, then a special navigation aid is presented in the HMD 2 in step 610. One example is to present a table of contents. The table of content may specify what page of the physical object 11 a user should turn to access a particular page of a particular version of the digital content.

If the marker is not a special navigation marker, then the page and version of the digital content that corresponds to the marker is determined, in step 692. In step 693, the page for that version of the digital content is presented in the HMD 2. Note that the organization might be to present one page of each version after another. Thus, the user could move from one version to the next to compare how the digital content was changed. For example, the user could turn to page 1 to see the first edit of a document, and then turn to page 2 to see the second edit of that document. Presenting one page of the digital content is just one example of a unit for display. A unit other than a page could be presented. Also, the presentation could be such that one version is on one page of the physical object 11 and the next version is on the opposite page. Therefore, the user can do a side-by-side comparison. Note that the presentation does not need to be on the page of the physical object 11.

Note that the process of identifying markers is made more accurate in one embodiment by identifying more than one marker at a time. For example, when a book is open typically two pages can be viewed by the camera. The system can attempt to identify the marker on each page. Since the system knows what markers are expected to be paired together, the system can attempt to resolve any uncertainty based on possible combinations of markers that are allowed.

In one embodiment, the process of accessing and presenting data is made more efficient by pre-fetching, pre-rendering, etc. of content. For example, if the user is flipping through the pages of the book sequentially, then the next marker(s) can be predicted. Therefore, the next content can be predicted. Therefore, pre-fetching, pre-rendering, and other anticipatory steps can be taken FIG. 7 is a block diagram of one embodiment of a computing system that can be used to implement one or more network accessible computing systems 12 which may host at least some of the software components of computing environment 54 or other elements depicted in FIG. 3. With reference to FIG. 7, an example system for implementing the invention includes a computing device, such as computing device 800. In its most basic configuration, computing device 800 typically includes one or more processing units 802 and may include different types of processors as well such as central processing units (CPU) and graphics processing units (GPU). Computing device 800 also includes memory 804. Depending on the exact configuration and type of computing device, memory 804 may include volatile memory 805 (such as RAM), non-volatile memory 807 (such as ROM, flash memory, etc.) or some combination of the two. This most basic configuration is illustrated in FIG. 7 by dashed line 806. Additionally, device 800 may also have additional features/functionality. For example, device 800 may also include additional storage (removable and/or non-removable) including, but not limited to, magnetic or optical disks or tape. Such additional storage is illustrated in FIG. 7 by removable storage 808 and non-removable storage 810.

Device 800 may also contain communications connection(s) 812 such as one or more network interfaces and transceivers that allow the device to communicate with other devices. Device 800 may also have input device(s) 814 such as keyboard, mouse, pen, voice input device, touch input device, etc. Output device(s) 816 such as a display, speakers, printer, etc. may also be included. All these devices are well known in the art and need not be discussed at length here.

Figure 8:
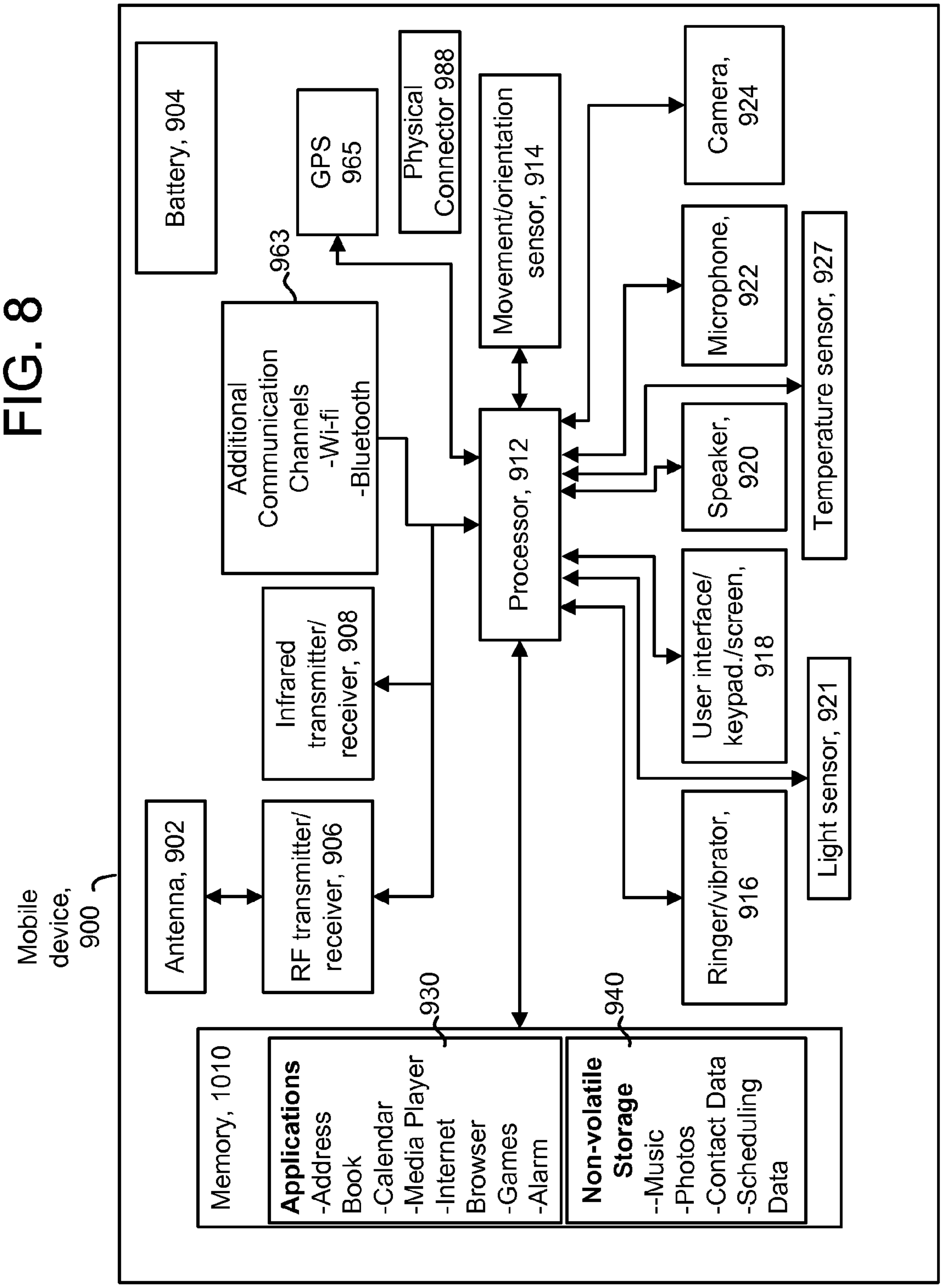
FIG. 8 is a block diagram of an exemplary mobile device which may operate in embodiments of the technology.

As discussed above, the processing unit 4 may be embodied in a mobile device 5. FIG. 8 is a block diagram of an exemplary mobile device 900 which may operate in embodiments of the technology. Exemplary electronic circuitry of a typical mobile phone is depicted. The phone 900 includes one or more microprocessors 912, and memory 910 (e.g., non-volatile memory such as ROM and volatile memory such as RAM) which stores processor-readable code which is executed by one or more processors of the control processor 912 to implement the functionality described herein.

Mobile device 900 may include, for example, processors 912, memory 1010 including applications and non-volatile storage. The processor 912 can implement communications, as well as any number of applications, including the interaction applications discussed herein. Memory 1010 can be any variety of memory storage media types, including non-volatile and volatile memory. A device operating system handles the different operations of the mobile device 900 and may contain user interfaces for operations, such as placing and receiving phone calls, text messaging, checking voicemail, and the like. The applications 930 can be any assortment of programs, such as a camera application for photos and/or videos, an address book, a calendar application, a media player, an internet browser, games, other multimedia applications, an alarm application, other third party applications like a skin application and image processing software for processing image data to and from the display device 2 discussed herein, and the like. The non-volatile storage component 940 in memory 910 contains data such as web caches, music, photos, contact data, scheduling data, and other files.

The user is able to navigate the various data stored on the mobile device 900 using a physical object 11, such as a book, in accordance with embodiments described herein. As noted, the mobile device 900 could be used as processor 4. As another alternative, system 8 has access to mobile device 900 and data stored thereon.

The processor 912 also communicates with RF transmit/receive circuitry 906 which in turn is coupled to an antenna 902, with an infrared transmitted/receiver 908, with any additional communication channels 960 like Wi-Fi, WUSB, RFID, infrared or Bluetooth, and with a movement/orientation sensor 914 such as an accelerometer. Accelerometers have been incorporated into mobile devices to enable such applications as intelligent user interfaces that let users input commands through gestures, indoor GPS functionality which calculates the movement and direction of the device after contact is broken with a GPS satellite, and to detect the orientation of the device and automatically change the display from portrait to landscape when the phone is rotated. An accelerometer can be provided, e.g., by a micro-electromechanical system (MEMS) which is a tiny mechanical device (of micrometer dimensions) built onto a semiconductor chip. Acceleration direction, as well as orientation, vibration and shock can be sensed. The processor 912 further communicates with a ringer/vibrator 916, a user interface keypad/screen, biometric sensor system 918, a speaker 920, a microphone 922, a camera 924, a light sensor 921 and a temperature sensor 927.

The processor 912 controls transmission and reception of wireless signals. During a transmission mode, the processor 912 provides a voice signal from microphone 922, or other data signal, to the RF transmit/receive circuitry 906. The transmit/receive circuitry 906 transmits the signal to a remote station (e.g., a fixed station, operator, other cellular phones, etc.) for communication through the antenna 902. The ringer/vibrator 916 is used to signal an incoming call, text message, calendar reminder, alarm clock reminder, or other notification to the user. During a receiving mode, the transmit/receive circuitry 906 receives a voice or other data signal from a remote station through the antenna 902. A received voice signal is provided to the speaker 920 while other received data signals are also processed appropriately.

Additionally, a physical connector 988 can be used to connect the mobile device 900 to an external power source, such as an AC adapter or powered docking station. The physical connector 988 can also be used as a data connection to a computing device. The data connection allows for operations such as synchronizing mobile device data with the computing data on another device.

A GPS receiver 965 utilizing satellite-based radio navigation to relay the position of the user applications is enabled for such service.

The example computer systems illustrated in the figures include examples of computer readable storage devices. Computer readable storage devices are also processor readable storage device. Such devices may include volatile and nonvolatile, removable and non-removable memory devices implemented in any method or technology for storage of information such as computer readable instructions, data structures, program modules or other data. Some examples of processor or computer readable storage devices are RAM, ROM, EEPROM, cache, flash memory or other memory technology, CD-ROM, digital versatile disks (DVD) or other optical disk storage, memory sticks or cards, magnetic cassettes, magnetic tape, a media drive, a hard disk, magnetic disk storage or other magnetic storage devices, or any other device which can be used to store the desired information and which can be accessed by a computer.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for navigating content, comprising:

receiving, by an electronic device coupled to a camera and a see-through, near-eye, mixed reality display, input that specifies what content is to be navigated by a user wearing the see-through, near-eye, mixed reality display, the content comprising an ordered data set from a calendar program that is organized based on a unit of time;

dividing, by the electronic device, the ordered data set into divisions based on the unit of time;

associating, by the electronic device, each of the divisions with a unique marker in a physical object that includes an ordered sequence of pages, the unique markers being on different ones of the pages and the divisions being assigned to different ones of the pages in accordance with an order of the ordered data set, the unit of time for each division being assigned to a unique marker;

identifying the unique markers in the physical object using the camera as the user manipulates the physical object, including identifying the unique markers in the ordered sequence of pages;

determining, by the electronic device, what division of the content is associated with each of the uniquely identified markers; and presenting images representing the divisions of the content associated with the uniquely identified markers in the see-through, near-eye, mixed reality display device, including presenting images representing the unit of time for the respective divisions in response to identifying the unique markers.

2. The method of claim 1, further comprising:

presenting a table of contents in the see-through, near-eye, mixed reality display device, the table of contents defines at which page of the ordered sequence of pages various divisions of the content can be accessed.

3. The method of claim 1, further comprising:

presenting chapter headings in the see-through, near-eye, mixed reality display device, the chapter headings pertaining to the content.

4. The method of claim 1, wherein the pages have content that is completely unrelated to the content presented in the see-through, near-eye, mixed reality display device for the corresponding page, the content on the pages serves as the markers.

5. The method of claim 1, wherein the content is a media file, the presenting images includes skipping over a pre-determined time in the media file for each page in the ordered sequence of pages that is identified.

6. The method of claim 1, wherein the page that the division is associated with corresponds to the location of the division in the content.

7. The method of claim 1, wherein the dividing the content from the calendar program into divisions that each comprise the same unit of time comprises dividing the content from the calendar program based on days; wherein the associating each of the divisions with a unique marker in a physical object that includes an ordered sequence of pages comprises associating days to the pages.

8. The method of claim 1, wherein the content is from a file system browser; wherein the dividing the ordered data set into divisions comprises dividing directories associated with the file system browser; wherein the associating each of the divisions with a unique marker in a physical object that includes an ordered sequence of pages comprises binding the directories to the pages.

9. The method of claim 1, further comprising:
- predicting, by the electronic device, which of the unique markers will be identified next by the camera in response to the user manipulating the physical object;
- determining, by the electronic device, what division of the content is associated with the predicted marker; and
- performing, by the electronic device, an anticipatory operation with respect to the division of the content that is associated with the predicted marker.

10. The method of claim 1, wherein the physical object comprises a book having the ordered sequence of pages.

11. The method for navigating content of claim 10, further comprising:
- accessing a thickness of the book, the pages having edges; and
- presenting a navigation aid to the user in the see-through, near-eye, mixed reality display as the user manipulates the book, comprising rendering tabs on the edges of the pages based on the thickness of the book.

12. A system comprising:
- a see-through, near-eye display device;
- an image sensor;
- logic in communication with the display device and the image sensor, the logic is configured to:
- receive input that specifies what digital content is to be navigated by a user that is manipulating a physical object that has unique markers, the physical object includes an ordered sequence of pages having edges, the unique markers being on different ones of the pages;
- access a thickness of the physical object;
- access the digital content to be navigated, the digital content comprises a set of ordered records;
- divide the digital content into divisions;
- associate each of the divisions with one of the unique markers in accordance with an order of the set of ordered records, the divisions being assigned to different ones of the pages, each division being assigned to a unique marker;
- identify the unique markers in the physical object using the image sensor as the user manipulates the physical object, including identifying the unique markers in the ordered sequence of pages;
- identify divisions of the digital content that are associated with the identified unique markers;
- present images representing the identified divisions of the digital content in the see-through, near-eye, display device, including presenting images representing respective divisions in response to identifying the unique markers; and
- present a navigation aid to the user in the see-through, near-eye, mixed reality display as the user manipulates the physical object, comprising the logic configured to render tabs on the edges of the pages of the physical object based on the thickness of the physical object.

13. The see-through, near-eye, display device system of claim 12, wherein the logic is configured to:
- present a table of contents in the see-through, near-eye display device, the table of contents defines which page of the ordered sequence of pages various portions of the digital content can be accessed at.

14. The see-through, near-eye, display device system of claim 12, wherein the logic is configured to:
- present chapter headings in the see-through, near-eye, mixed reality display device, the chapter headings pertaining to the digital content.

15. The see-through, near-eye, display device system of claim 12, wherein the logic is further configured to scrub through the digital content in response to the user turning the pages, the digital content further comprises a media file including audio and/or video signals, the logic configured to skip over a pre-determined time of the media file for each page in the ordered sequence of pages that is identified using the image sensor.

16. The see-through, near-eye, display device system of claim 12, wherein the logic being configured to present images representing the identified divisions of the digital content in the see-through, near-eye, display device includes the logic being configured to:
- present one element of the digital content for each page of the ordered sequence of pages.

17. The see-through, near-eye, display device system of claim 12, wherein the digital content comprises an ordered data set from a calendar program, wherein the logic is configured to:
- divide the digital content from the calendar program into divisions that each comprise a day, the days being assigned to different ones of the pages of the physical object; and
- in response to identifying the unique markers, present images representing the days in the see-through, near-eye, display device.

18. The see-through, near-eye, display device system of claim 12, wherein the physical object comprises a book having the ordered sequence of pages.

19. A system comprising:
- a see-through, near-eye display device;
- an image sensor;
- logic in communication with the display device and the image sensor, the logic is configured to:
- receive input that specifies that directories associated with a file browser are to be navigated using a physical object that includes an ordered sequence of pages;
- associate ones of the directories with unique markers in the physical object, the unique markers being on different ones of the pages and the ones of the directories being assigned to different ones of the pages in accordance with an order of the directories;

identify the unique markers in the ordered sequence of pages using the image sensor as a user manipulates the physical object;

determine which of the directories are associated with the identified unique markers; and in response to identifying the unique markers, present images representing the directories in the see-through, near-eye, display device.

20. The system of claim 19, wherein the logic is configured to bind the ones of the directories with unique markers in the physical object in response to the file browser being opened.

21. A system comprising:

a see-through, near-eye display;

an image sensor;

logic in communication with the see-through, near-eye display and the image sensor, the logic configured to:

receive input that specifies what content is to be navigated by a user wearing the see-through, near-eye display, the content comprising an ordered data set from a calendar program that is organized based on a unit of time;

divide the ordered data set into divisions based on the unit of time;

associate each of the divisions with a unique marker in a physical object that includes an ordered sequence of pages, the unique markers being on different ones of the pages and the divisions being assigned to different ones of the pages in accordance with an order of the ordered data set, the unit of time for each division being assigned to a unique marker;

identify the unique markers in the physical object using the image sensor as the user manipulates the physical object, including the logic configured to identify the unique markers in the ordered sequence of pages;

determine what division of the content is associated with each of the uniquely identified markers; and present images representing the divisions of the content associated with the uniquely identified markers in the see-through, near-eye display, including the logic configured to present images that represent the unit of time for the respective divisions in response to identifying the unique markers.

22. A method, comprising:

receiving, at an electronic device, input that specifies what digital content is to be navigated by a user that is manipulating a physical object that has unique markers, the physical object includes an ordered sequence of pages having edges, the unique markers being on different ones of the pages, the electronic device comprising an image sensor and a see-through, near-eye display;

accessing, by the electronic device, a thickness of the physical object;

accessing, by the electronic device, the digital content to be navigated, the digital content comprises a set of ordered records;

dividing the digital content into divisions by the electronic device;

associating, by the electronic device, each of the divisions with one of the unique markers in accordance with an order of the set of ordered records, the divisions being assigned to different ones of the pages, each division being assigned to a unique marker;

identifying the unique markers in the physical object using the image sensor as the user manipulates the physical object, including identifying the unique markers in the ordered sequence of pages;

identifying, by the electronic device, divisions of the digital content that are associated with the identified unique markers;

presenting images representing the identified divisions of the digital content in the see-through, near-eye display, including presenting images that represent respective divisions in response to identifying the unique markers; and presenting a navigation aid to the user in the see-through, near-eye display as the user manipulates the physical object, comprising rendering tabs on the edges of the pages of the physical object based on the thickness of the physical object.

23. A method, comprising:

receiving, at an electronic system, input that specifies that directories associated with a file browser are to be navigated using a physical object that includes an ordered sequence of pages, the electronic system comprising a see-through, near-eye display and an image sensor;

associating, by the electronic system, ones of the directories with unique markers in the physical object, the unique markers being on different ones of the pages and the ones of the directories being assigned to different ones of the pages in accordance with an order of the directories;

identifying the unique markers in the ordered sequence of pages using the image sensor as a user manipulates the physical object;

determining, by the electronic system, which of the directories are associated with the identified unique markers; and in response to identifying the unique markers, presenting images representing the directories in the see-through, near-eye display.

* * * * *